US011130693B1

(12) United States Patent
Dumbaugh et al.

(10) Patent No.: US 11,130,693 B1
(45) Date of Patent: Sep. 28, 2021

(54) COMBINATION BIOLOGICAL CONTACTOR AND SELF-BACKWASHING FILTER SYSTEMS

(71) Applicant: WesTech Engineering, LLC, Salt Lake City, UT (US)

(72) Inventors: Thomas Martin Dumbaugh, Maxwell, IA (US); Eric Allen Lawrence, Madrid, IA (US); Rand S Faaborg, Garden City, IA (US); Darrell Wayne Christianson, Boone, IA (US); Brian Lee Primrose, Nevada, IA (US); Rene Ann Carson, Ames, IA (US)

(73) Assignee: WesTech Engineering, LLC, Salt Lake City, UT (US)

( * ) Notice: Subject to any disclaimer, the term of this patent is extended or adjusted under 35 U.S.C. 154(b) by 0 days.

(21) Appl. No.: 16/777,328

(22) Filed: Jan. 30, 2020

(51) Int. Cl.
*C02F 3/30* (2006.01)
*C02F 3/28* (2006.01)
*B01D 24/12* (2006.01)
*C02F 1/00* (2006.01)
*C02F 3/04* (2006.01)
*C02F 101/16* (2006.01)

(52) U.S. Cl.
CPC .............. *C02F 3/303* (2013.01); *B01D 24/12* (2013.01); *C02F 1/004* (2013.01); *C02F 3/2846* (2013.01); *C02F 3/043* (2013.01); *C02F 2101/16* (2013.01); *C02F 2303/16* (2013.01)

(58) Field of Classification Search
CPC ........ B01D 24/12; C02F 1/004; C02F 3/2846; C02F 3/043; C02F 2303/16; C02F 2101/16

USPC ....... 210/605, 615, 616, 617, 618, 630, 903, 210/150, 151
See application file for complete search history.

(56) References Cited

U.S. PATENT DOCUMENTS

| 3,876,541 | A | 4/1975 | Anderson | |
|---|---|---|---|---|
| 4,191,652 | A * | 3/1980 | Whitmore | B01D 24/205 210/274 |
| 4,988,439 | A * | 1/1991 | Medders, II | B01D 24/005 210/264 |
| 5,779,895 | A | 7/1998 | Biskner | |
| 8,029,674 | B2 | 10/2011 | Lytle | |
| 2007/0007215 | A1* | 1/2007 | Lawrence | C02F 1/5245 210/726 |
| 2011/0253613 | A1* | 10/2011 | St. Germain | C02F 1/5245 210/195.3 |
| 2017/0321182 | A1* | 11/2017 | Hazlebeck | C12M 29/04 |

OTHER PUBLICATIONS

Degremont, Water Treatment Handbook; apparently published in 1991, vol. 2, Sixth Edition, p. 740 (shown in attachment 1).

(Continued)

*Primary Examiner* — Fred Prince
(74) *Attorney, Agent, or Firm* — Austin Rapp

(57) ABSTRACT

A combination biological contactor and self-backwashing filter system for water treatment is disclosed. The system may include a treatment vessel defining an upper chamber and a lower chamber. A biological contactor may be disposed within the upper chamber, and a filter may be disposed in the lower chamber. A contactor outlet conduit and inlet manifold may be used to transfer water from the biological contactor to filter cells within the filter.

20 Claims, 18 Drawing Sheets

(56) References Cited

OTHER PUBLICATIONS

Degremont, Water Treatment Handbook; apparently published in 2007, vol. 2, Seventh Edition, pp. 1510-1522 (shown in attachment 2).
General Filter Company, PakTOR Packed Bed Reactor; brochure, apparently published in Aug. 1973 (shown in attachment 3).
General Filter Company, PakTOR Nitrification with Packed-Bed Reactors; product launch pamphlet, apparently published at least by Oct. 1975 (shown in attachment 4).
James C. Young, E. Robert Baumann, and Danny J. Wall, Packed-Bed Reactor for Secondary Effluent BOD and Ammonia Removal; Water Pollution Control Federation Journal, apparently published in Jan. 1975, pp. 46-56 (shown in attachment 5).
U.S. Environmental Protection Agency, Process Design Manual for Nitrogen Control; apparently published in Oct. 1975, pp. 4-72 to 4-76 (shown in attachment 6).
General Filter Company, PakTOR Packed Bed Reactor (shown in attachments 3-6), apparently sold or offered for sale at least Jan. 1, 1975.
General Filter Company, Aeralater, Complete Packaged Filter Plant, brochure, apparently published in Jan. 1981 (shown in attachment 7).
General Filter Company, Aeralater, (shown in attachment 7), apparently sold or offered for sale on or at least by Jan. 1, 1970.
Westech Engineering, Inc., Aeralater, Iron and Manganese Removal System, web page [online], apparently published at least by Aug. 17, 2018 [retrieved from the Internet from <URL:http://web.archive.org/web/20180817232801/http://www.westech-inc.com/en-usa/products/iron-manganese-removal-system-aeralater> on Apr. 20, 2020] (shown in attachment 8).
Westech Engineering, Inc., Aeralater, Packaged Iron and Manganese Removal, brochure, apparently published in 2013 (shown in attachment 9).
Westech Engineering, Inc., Aeralater (shown in attachments 8-9), apparently sold or offered for sale on at least by Sep. 1, 2013.
Adedge Water Technologies, LLC, Containerized Treatment Solutions; web page [online], apparently published at least by Jan. 1, 2017 [retrieved from the Internet from <URL:http://www.adedgetech.com> on Nov. 27, 2019] (shown in attachment 10).
Adedge Water Technologies, LLC, Ammonia, Ammonia Reduction; web page [online], apparently published at least by Jan. 1, 2017 [retrieved from the Internet from <URL:http://www.adedgetech.com/ammonia> on Nov. 27, 2019] (shown in attachment 11).
Adedge Water Technologies, LLC, NoMonia Biotreatment Solutions; brochure, apparently published at least by Jan. 1, 2017 [ (shown in attachment 12).
U.S. Water; Tonka Water Water Treatment Solutions; web page [online], published on Aug. 31, 2018 [retrieved from the Internet from <URL:http://web.archive.org/web/20180831171429/https://www.tonkawater.com/> on Apr. 20, 2020] (shown in attachment 13).
U.S. Water; Tonka Water Water Treatment Solutions; web page [online], apparently published on or before Nov. 27, 2019 [retrieved from the Internet from <URL:http://www.tonkawater.com> on Nov. 27, 2019] (shown in attachment 14).
U.S. Water; Tonka Water Dualator Filters; web page [online], published on Aug. 29, 2017 [retrieved from the Internet from <URL:http://web.archive.org/web/20170829084113/http://www.tonkawater.com/dualators.cfm> on Apr. 20, 2020] (shown in attachment 15).
U.S. Water; Tonka Water Dualator Series; web page [online], apparently published on or before Nov. 27, 2019 [retrieved from the Internet from <URL:http://www.tonkawater.com/products/dualator-series> on Nov. 27, 2019] (shown in attachment 16).
U.S. Water; Tonka Water Dualator Series; brochure, apparently published in 2018 (shown in attachment 17).
U.S. Water; Tonka Water Dualator (shown in attachments 13-17), apparently sold or offered for sale in or before 1990.
Refinite Water; Pure Water Is Our Solution; web page [online], published May 12, 2017 [retrieved from the Internet from <URL:http://web.archive.org/web/20170512180439/http://water-eg.com/> on Apr. 10, 2020 (shown in attachment 18).
Refinite Water; Horizontal Pressure Filters (shown in attachment 18) apparently sold or offered for sale in or at least by 1979.

\* cited by examiner

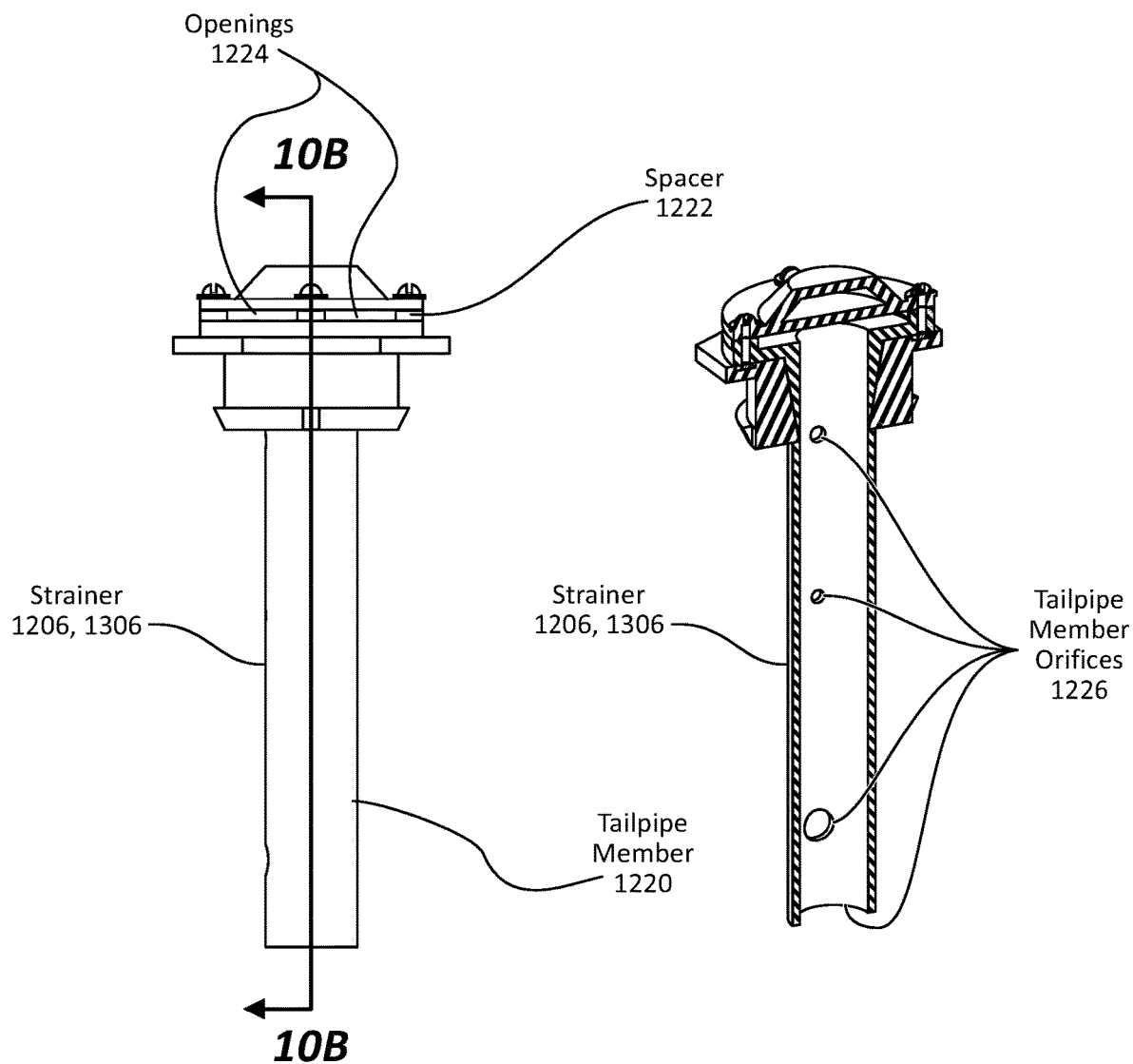
FIG. 10A  FIG. 10B

COMBINATION BIOLOGICAL CONTACTOR AND SELF-BACKWASHING FILTER SYSTEMS

TECHNICAL FIELD

The present invention relates generally to water treatment systems. More specifically, the present invention relates to combination biological contactor and self-backwashing filter systems for water treatment.

BACKGROUND

Water treatment systems are complex and often involve a series of discrete steps that employ pumps to transfer water between the discrete steps and to provide for backwashing of filters or contactors. Obviating the need for one or more pumps within such a system is a complex endeavor and, if achieved, comprises a significant advancement in the art because maintenance, expenditures and potential failure points are reduced.

SUMMARY

Embodiments of the disclosed subject matter are provided below for illustrative purposes and are in no way limiting of the claimed subject matter.

A first set of variations of a combination biological contactor and self-backwashing filter system for water treatment is disclosed. The system may have a vertical dimension when the system is in an installed orientation. The system may comprise a treatment vessel defining an upper chamber and a lower chamber. The upper chamber may be disposed above the lower chamber along the vertical dimension when the system is in the installed orientation.

The system may further comprise an upflow biological contactor disposed within the upper chamber. The upflow biological contactor may comprise a contactor plenum separated from a contactor media chamber by a distribution plate. The contactor media chamber may comprise biological contactor media. The contactor plenum may be in fluid communication with the contactor media chamber via one or more contactor strainers disposed within the distribution plate.

The system may further comprise a downflow granular media filter disposed within the lower chamber. The downflow granular media filter may comprise a filter region and a filter plenum separated by a filter underdrain plate. The filter region may be disposed above the filter plenum along the vertical dimension when the system is in the installed orientation. The filter region may comprise three or more filter cells separated by cell walls. Each of the filter cells may comprise filter media with the filter plenum being in fluid communication with each of the filter cells via one or more filter strainers disposed within the filter underdrain plate.

The system may further comprise a contactor outlet conduit in fluid communication with the contactor media chamber and an inlet manifold. The inlet manifold may comprise a plurality of inlet manifold branches. Each of the inlet manifold branches may be in controllable fluid communication with one of a plurality of inlet-outlet conduits employing at least one of a plurality of inlet manifold valves. Each of the inlet-outlet conduits may be in fluid communication with one of the filter cells.

An outlet manifold may comprise a plurality of outlet manifold branches. Each of the outlet manifold branches may be in controllable fluid communication with one of the plurality of the inlet-outlet conduits and a waste-drain conduit employing at least one of a plurality of outlet manifold valves.

The contactor outlet conduit may include a downward incline such that when the system is in the installed orientation and in an operating mode with water disposed in the contactor outlet conduit, the water in the contactor outlet conduit is directed by gravity generated head pressure toward the inlet manifold.

The inlet-outlet opening of a first inlet-outlet conduit of the inlet-outlet conduits may be disposed within a first filter cell of the filter cells. The contactor outlet conduit, the inlet manifold, and the first inlet-outlet conduit of the inlet-outlet conduits may be shaped to define a first offset along the vertical dimension between an inlet of the contactor outlet conduit and the inlet-outlet opening of the first inlet-outlet conduit of the inlet-outlet conduits such that when the system is in the installed orientation and in an operating mode with water disposed in the contactor outlet conduit, gravity generated head pressure is sufficient to cause the water in the contactor outlet conduit to pass into the first filter cell of the filter cells when all intervening valves are open.

A first inlet-outlet conduit of the inlet-outlet conduits comprises an inlet-outlet opening disposed within a first filter cell of the filter cells. The contactor outlet conduit, the inlet manifold, the first inlet-outlet conduit of the inlet-outlet conduits and the first filter cell of the filter cells may be shaped to define a second offset along the vertical dimension between an inlet of the contactor outlet conduit and a remote end of the first filter cell of the filter cells such that when the system is in the installed orientation and in a filter cleaning mode with water disposed in the contactor outlet conduit, gravity generated head pressure is sufficient to cause the water in the contactor outlet conduit to pass down through a second cell of the filter cells and up through the first filter cell of the filter cells when all intervening valves are open.

A contactor air inlet connector may be disposed in a wall of the treatment vessel for placing the contactor plenum in controllable fluid communication with a pressurized air source employing a contactor air inlet valve. A contactor water inlet connector may be disposed in the wall of the treatment vessel for placing a pressurized water source in controllable fluid communication with the contactor plenum employing a contactor water inlet valve. A filter water outlet connector may be disposed in the wall of the treatment vessel for conveyance of processed water out of the filter plenum in a controlled manner employing a filter water outlet valve.

The cell walls may separate the filter plenum into plenum cells. The system may further comprise a filter air manifold having a plurality of filter air manifold branches for controllably providing air to at least one plenum cell of the plenum cells employing a plurality of filter air manifold branch valves.

The filter air manifold may comprise one or more air wash grid assemblies. Each of the one or more air wash grid assemblies may comprise interconnected conduits with one or more air outlet apertures disposed within the interconnected conduits. One of the one or more air wash grid assemblies may be disposed within each of the filter cells.

The system may further comprise a controller configured to open each of the inlet manifold valves, to open the contactor air inlet valve, to open the contactor water inlet valve, to open the filter water outlet valve, to close each of the outlet manifold valves and to close each of the filter air manifold branch valves during an operating mode.

The system may further comprise a controller configured to close a first inlet manifold valve of the inlet manifold valves that controls a flow of water into a first filter cell of the filter cells and to open each remaining inlet manifold valve, to open the contactor air inlet valve, to open the contactor water inlet valve, to close the filter water outlet valve, to open a first outlet manifold valve of the outlet manifold valves that controls a flow of water from the first filter cell of the filter cells and to close each remaining outlet manifold valve during a filter cleaning mode.

The system may further comprise a contactor outlet conduit valve disposed within the contactor outlet conduit to control passage of water into the inlet manifold, and a waste-drain conduit in controllable fluid communication with the contactor outlet conduit employing a waste-drain conduit valve.

The system may further comprise a controller configured to open the contactor air inlet valve, to open the contactor water inlet valve, to close the contactor outlet conduit valve, to open the waste-drain conduit valve, to alter at least one of the pressurized air source to increase a flow of air through the contactor air inlet valve and the pressurized water source to increase a flow of water through the contactor water inlet valve, and to close each of the filter air manifold branch valves during a contactor cleaning mode for the upflow biological contactor.

The system may further comprise biology disposed on the biological contactor media, wherein the biology reduces ammonia within water disposed in the contactor media chamber.

A second set of variations of a combination biological contactor and self-backwashing filter system for water treatment is disclosed. The system may have a vertical dimension when the system is in an installed orientation.

The system may comprise a treatment vessel defining an upper chamber and a lower chamber. The upper chamber may be disposed above the lower chamber along the vertical dimension when the system is in the installed orientation.

The system may comprise a biological contactor disposed within the upper chamber. The biological contactor may comprise a contactor plenum separated from a contactor media chamber by a distribution plate. The contactor media chamber may comprise biological contactor media. The contactor plenum may be in fluid communication with the contactor media chamber via one or more distribution plate orifices disposed within the distribution plate.

The system may comprise a downflow granular media filter disposed within the lower chamber. The downflow granular media filter may comprise a filter region and a filter plenum separated by a filter underdrain plate. The filter region may be disposed above the filter plenum along the vertical dimension when the system is in the installed orientation. The filter region may comprise three or more filter cells separated by cell walls. Each of the filter cells may comprise filter media. The filter plenum may be in fluid communication with each of the filter cells via one or more filter underdrain plate orifices disposed within the filter underdrain plate.

The system may further comprise a contactor outlet conduit in fluid communication with the contactor media chamber and an inlet manifold. The inlet manifold may comprise a plurality of inlet manifold branches. Each of the inlet manifold branches may be in controllable fluid communication with one of the filter cells.

The contactor outlet conduit may include a downward incline such that when the system is in the installed orientation and in an operating mode with water disposed in the contactor outlet conduit, the water in the contactor outlet conduit is directed by gravity generated head pressure toward the inlet manifold.

The cell walls may separate the filter plenum into plenum cells. A contactor air inlet connector may be disposed in a wall of the treatment vessel for placing the contactor plenum in controllable fluid communication with a pressurized air source employing a contactor air inlet valve. A contactor water inlet connector may be disposed in the wall of the treatment vessel for placing a pressurized water source in controllable fluid communication with the contactor plenum employing a contactor water inlet valve. A filter water outlet connector may be disposed in the wall of the treatment vessel for conveyance of processed water out of the filter plenum in a controlled manner employing a filter water outlet valve. The system may comprise a filter air manifold having a plurality of filter air manifold branches for controllably providing air to at least one plenum cell of the plenum cells employing a plurality of filter air manifold branch valves. The system may also comprise a controller configured to close a first inlet manifold valve of the inlet manifold valves that controls a flow of water into a first filter cell of the filter cells and to open each remaining inlet manifold valve, to open the contactor air inlet valve, to open the contactor water inlet valve, to close the filter water outlet valve, to open a first outlet manifold valve of the outlet manifold valves that controls a flow of water from the first filter cell of the filter cells and to close each remaining outlet manifold valve during a filter cleaning mode.

A third set of variations of a combination biological contactor and self-backwashing filter system for water treatment is disclosed. The system may have a vertical dimension when the system is in an installed orientation. The system may comprise a treatment vessel defining an upper chamber and a lower chamber. The upper chamber may be disposed above the lower chamber along the vertical dimension when the system is in the installed orientation. The system may comprise a biological contactor disposed within the upper chamber. The biological contactor may comprise a contactor media chamber. The contactor media chamber may comprise biological contactor media. The system may also comprise a downflow granular media filter disposed within the lower chamber. The downflow granular media filter may comprise a filter region. The filter region may comprise three or more filter cells separated by cell walls. Each of the filter cells may comprise filter media.

The system may comprise a contactor outlet conduit in fluid communication with the contactor media chamber and an inlet manifold. The inlet manifold may comprise a plurality of inlet manifold branches. Each of the inlet manifold branches may be in controllable fluid communication with one of the filter cells employing at least one of a plurality of inlet manifold valves. The contactor outlet conduit may include a downward incline such that when the system is in the installed orientation and in an operating mode with water disposed in the contactor outlet conduit, the water in the contactor outlet conduit is directed by gravity generated head pressure toward the inlet manifold.

The system may further comprise an air input system in fluid communication with the contactor media chamber, and a water input system in fluid communication with the contactor media chamber.

The system may further comprise a filter underdrain plate disposed within the downflow granular media filter, and a filter strainer disposed within each of one or more filter underdrain plate orifices in the filter underdrain plate.

The air input system may comprise a set of interconnected conduits positioned within the contactor media chamber.

The system may further comprise a plurality of inlet-outlet conduits. Each inlet-outlet conduit may place one of the plurality of inlet manifold branches in fluid communication with one of the filter cells. An inlet-outlet opening of a first inlet-outlet conduit of the inlet-outlet conduits may be disposed within a first filter cell of the filter cells. The contactor outlet conduit, the inlet manifold, and the first inlet-outlet conduit of the inlet-outlet conduits may be shaped to define a first offset along the vertical dimension between an inlet of the contactor outlet conduit and the inlet-outlet opening of the first inlet-outlet conduit of the inlet-outlet conduits such that when the system is in the installed orientation and in the operating mode with water disposed in the contactor outlet conduit, gravity generated head pressure is sufficient to cause the water in the contactor outlet conduit to pass into the first filter cell of the filter cells when all intervening valves are open.

The cell walls may separate a filter plenum into plenum cells. The system may further comprise an outlet manifold comprising a plurality of outlet manifold branches. Each of the outlet manifold branches may be in controllable fluid communication with one of the plurality of the inlet-outlet conduits and a waste-drain conduit employing at least one of a plurality of outlet manifold valves. The system may further comprise a contactor air inlet connector disposed in a wall of the treatment vessel for placing the contactor media chamber in controllable fluid communication with a pressurized air source employing a contactor air inlet valve. The contactor air inlet connector and the contactor air inlet valve may comprise a portion of the air input system. The system may further comprise a contactor water inlet connector disposed in the wall of the treatment vessel for placing a pressurized water source in controllable fluid communication with the contactor media chamber employing a contactor water inlet valve. The contactor water inlet connector and the contactor water inlet valve may comprise a portion of the water input system. The system may comprise a filter water outlet valve positioned to control a flow of processed water out of the downflow granular media filter. The system may further comprise a filter air manifold having a plurality of filter air manifold branches for controllably providing air to at least one plenum cell of the plenum cells employing a plurality of filter air manifold branch valves. The system may further comprise a controller configured to close a first inlet manifold valve of the inlet manifold valves that controls a flow of water into a first filter cell of the filter cells and to open each remaining inlet manifold valve, to open the contactor air inlet valve, to open the contactor water inlet valve, to close the filter water outlet valve, to open a first outlet manifold valve of the outlet manifold valves that controls a flow of water from the first filter cell of the filter cells and to close each remaining outlet manifold valve during a filter cleaning mode. The contactor outlet conduit, the inlet manifold, the first inlet-outlet conduit of the inlet-outlet conduits and the first filter cell of the filter cells may be shaped to define a second offset along the vertical dimension between the inlet of the contactor outlet conduit and a remote end of the first filter cell of the filter cells such that when the system is in the installed orientation and in the filter cleaning mode with water disposed in the contactor outlet conduit, gravity generated head pressure is sufficient to cause the water in the contactor outlet conduit to pass down through a second filter cell of the filter cells and up through the first filter cell of the filter cells when all intervening valves are open.

BRIEF DESCRIPTION OF THE DRAWINGS

Various embodiments of the invention will become apparent from the following description and appended claims, taken in conjunction with the accompanying drawings. Understanding that these drawings depict only examples of the invention thereof and are, therefore, not to be considered limiting of the invention's scope, particular embodiments will be described with additional specificity and detail through use of the accompanying drawings in which:

FIG. 10A is a right side elevational view of a strainer of the embodiment of the system shown in FIG. 1;

FIG. 10B is a rear perspective, cross-sectional view of a strainer of the embodiment of the system shown in FIG. 1 taken across the line 10B-10B in FIG. 10A;

Figure 1:
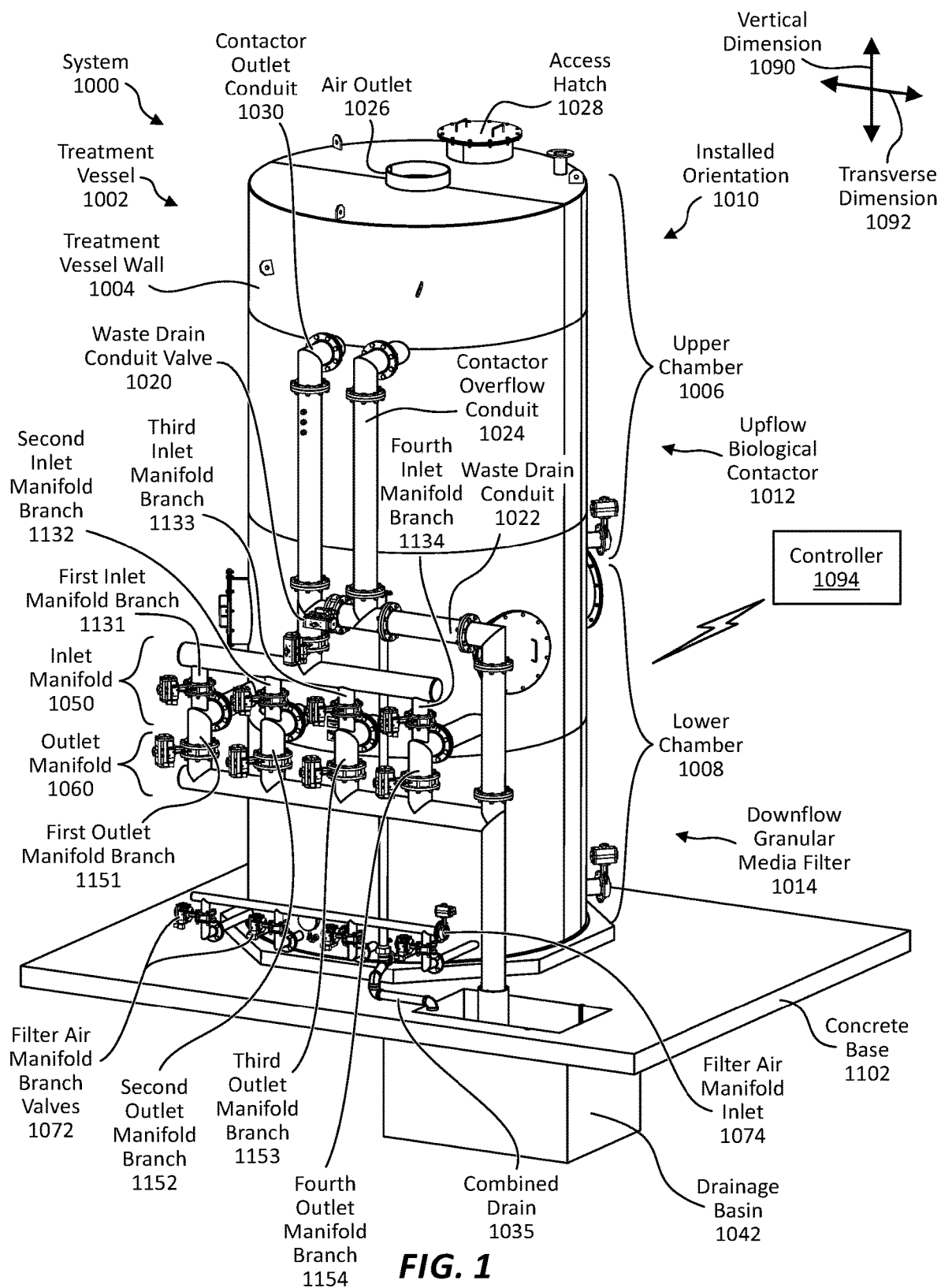
FIG. 1 is a front perspective view of a first embodiment of a combination biological contactor and self-backwashing filter system for water treatment.

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the present disclosure are described below. It should be apparent that the teachings herein may be embodied in a wide variety of forms and that any specific structure, function, or both disclosed herein is merely representative. Based on the teachings herein, one skilled in the art should appreciate that an aspect disclosed herein may be implemented independently of any other aspects and that two or more of these aspects may be combined in various ways, even if that combination is not specifically illustrated in the figures. For example, an apparatus may be implemented, or a method may be practiced, using any number of the aspects set forth herein whether disclosed in connection with a method or an apparatus. Further, the disclosed apparatuses and methods may be practiced using structures or functionality known to one of skill in the art at the time this application was filed, although not specifically disclosed within the application.

By way of introduction, the following brief definitions are provided for various terms used in this application. Additional definitions will be provided in the context of the discussion of the figures herein. As used herein, "exemplary" can indicate an example, an implementation, and/or an aspect, and should not be construed as limiting or as indicating a preference or a preferred implementation. Further, it is to be appreciated that certain ordinal terms (e.g., "first" or "second") can be provided for identification and ease of reference and may not necessarily imply physical characteristics or ordering. Therefore, as used herein, an ordinal term (e.g., "first," "second," "third") used to modify an element, such as a structure, a component, an operation, etc., does not necessarily indicate priority or order of the element with respect to another element, but rather distinguishes the element from another element having a same name (but for use of the ordinal term). In addition, as used herein, indefinite articles ("a" and "an") can indicate "one or more" rather than "one." As used herein, a structure or operation that "comprises" or "includes" an element can include one or more other elements not explicitly recited. Thus, the terms "including," "comprising," "having," and variations thereof signify "including but not limited to" unless expressly specified otherwise. Further, an operation performed "based on" a condition or event can also be performed based on one or more other conditions or events not explicitly recited. As used in this application, the terms "an embodiment," "one embodiment," "another embodiment," or analogous language do not refer to a single variation of the disclosed subject matter; instead, this language refers to variations of the disclosed subject matter that can be applied and used with a number of different implementations of the disclosed subject matter. An enumerated listing of items does not imply that any or all of the items are mutually exclusive and/or mutually inclusive, unless expressly specified otherwise.

Different embodiments disclosed herein will be assigned reference numerals chosen from groups of one thousand. For example, a first embodiment may include numbers within the range 1000-1999, and a second embodiment may include numbers within the range 2000-2999. Similar parts in the different embodiments include analogous numbers. For example, a component in a first embodiment may be assigned reference numeral 1024, while a similar component in the second embodiment may be assigned reference numeral 2024. When an item or component is shown multiple times in a single figure, not all such instances of the item or component will be labeled with a reference numeral to avoid the undue proliferation of reference numerals. Likewise, when multiple figures are discussed as a group, items or components appearing multiple times in the group of figures will generally not all be labeled with reference numerals to avoid the undue proliferation of reference numerals.

For this application, the phrases "secured to," "connected to," "coupled to," and "in communication with" refer to any form of interaction between two or more entities, including mechanical, electrical, magnetic, electromagnetic, and thermal interaction and may also include integral formation fluid communication. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "attached directly to" refers to a form of attachment by which the attached items are either in direct contact, or are only separated by a single fastener, adhesive, or other attachment mechanisms. The term "abut" refers to items that are in direct physical contact with each other, although the items may be attached, secured, fused, or welded together. The term "integrally formed" refers to a body that is manufactured integrally, i.e., as a single piece, without requiring the assembly of multiple pieces. Multiple parts may be integrally formed with each other if they are formed from a single workpiece.

The phrase "substantially coaxially aligned," as used herein, signifies that the pertinent members, components, or items that are "substantially coaxially aligned" with each other are within 15° of being perfectly coaxially aligned with each other. As used herein the term "substantially coaxially aligned" may signify that two items are aligned such that they share a common, imaginary axis (or within 15° of sharing the same common, imaginary axis) extending through both of the items, although the items may be spaced apart along that common, imaginary axis. In various embodiments, the term "offset and substantially coaxially aligned" signifies that two items are aligned such that they share a common, imaginary axis (or within 15° of sharing the same common, imaginary axis) extending through both of the items and the items are spaced apart along the common, imaginary axis. In various embodiments, "overlapping and substantially coaxially aligned" signifies that two items are aligned such that they share a common, imaginary axis (or within 15° of sharing the same common, imaginary axis) extending through both of the items and the items overlap along the common, imaginary axis. In various embodiments, "coextensive and substantially coaxially aligned" signifies that two items are aligned such that they share a common, imaginary axis (or within 15° of sharing the same common, imaginary axis) extending through both of the items and the items are coextensive along the common, imaginary axis.

The phrase "substantially parallel," as used herein, signifies that the pertinent members, components, or items that are "substantially parallel" to each other are within 15° of being perfectly parallel to each other.

The phrase "substantially prevent" pivoting of two identified items, as used herein, signifies that the pertinent members, in certain embodiments, can pivot no more than 6° relative to each other.

As used herein, in various embodiments, the term "center point nonalignment" when used to identify a relative position of items, features or components along a designated axis, in various embodiments, signifies that the center points of each of the two identified items are not aligned along the designated axis. In alternative embodiments, the term "outer boundary nonalignment" may be used to signify that the outer boundaries of two items do not overlap along a designated axis. The term "nonaligned positions" indicates that two items are not aligned along at least one axis and may refer, for example, to either center point nonalignment or outer boundary nonalignment.

As used herein, the term "generally" indicates that a particular item is within 15° of a specified orientation or value. As used herein, the term "substantially" indicates that a particular value is within 15% of a specified value.

In the figures, certain components may appear many times within a particular drawing. However, only certain instances of the component may be identified in the figures to avoid unnecessary repetition of reference numbers and lead lines. According to the context provided in the description while referring to the figures, reference may be made to a specific one of that particular component or multiple instances, even if the specifically referenced instance or instances of the component are not identified by a reference number and lead line in the figures.

First Embodiment

FIGS. 1-13 illustrate various views of a first embodiment of a combination biological contactor and self-backwashing filter system 1000 for water treatment or portions thereof. As used herein, the "treatment of water" or "water treatment" refer, for example, to the treatment (i.e., the removal of undesired materials or impurities) of drinking water and wastewater, and to the treatment of water in connection with industrial processes, such as fracking.

It should be noted that the pressurized air source 1401 and pressurized water source 1402 are only included once in the figures to simplify the drawings, but would be present in an operating version of the disclosed subject matter. By way of definition, however, the pressurized air source 1401 and pressurized water source 1402 comprise optional portions of the disclosed system 1000. Likewise, a controller 1094, for example, comprises an optional portion of the system 1000 because the system 1000 may be manually operated. Also, a legend is presented in FIG. 5, but is applicable to pertinent versions of all of the figures including the symbols in the legend in connection with the first embodiment of the system 1000.

Figure 5:
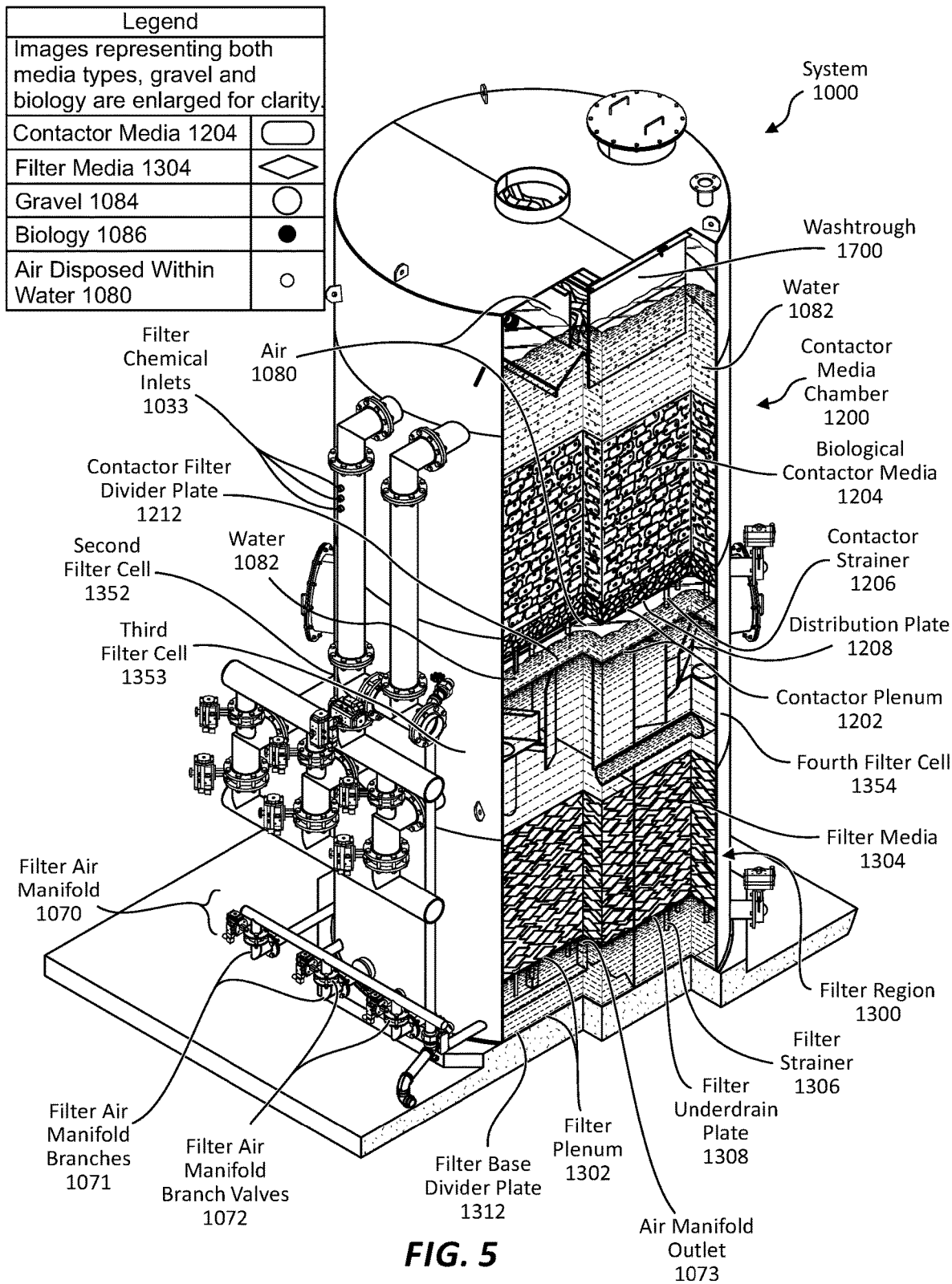
FIG. 5 comprises a front perspective cross-sectional view of the embodiment of the system of FIG. 1 taken across the line 5-5 in FIG. 9B.

Air 1080 is depicted in the figures with a circular shape when the air 1080 is disposed within water 1082, as indicated in the legend in FIG. 5. However, air 1080 would also be present at various other locations within the system 1000 and is represented as whitespace within the treatment vessel 1002 (e.g., above the water 1082 within the contactor media chamber 1200, above water 1082 within the contactor plenum 1202 and above water 1082 within the filter plenum 1302 of a filter cell 1351, 1352, 1353, 1354 being cleaned when the system 1000 is positioned in an installed orientation 1010 and in a cleaning mode 1500 (illustrated in FIG. 12)).

FIGS. 1-9B

FIGS. 1-9B will be discussed concurrently. Part numbers utilized in this discussion will be included in at least one of FIGS. 1-9B, but not necessarily in each of these figures.

Figure 2:
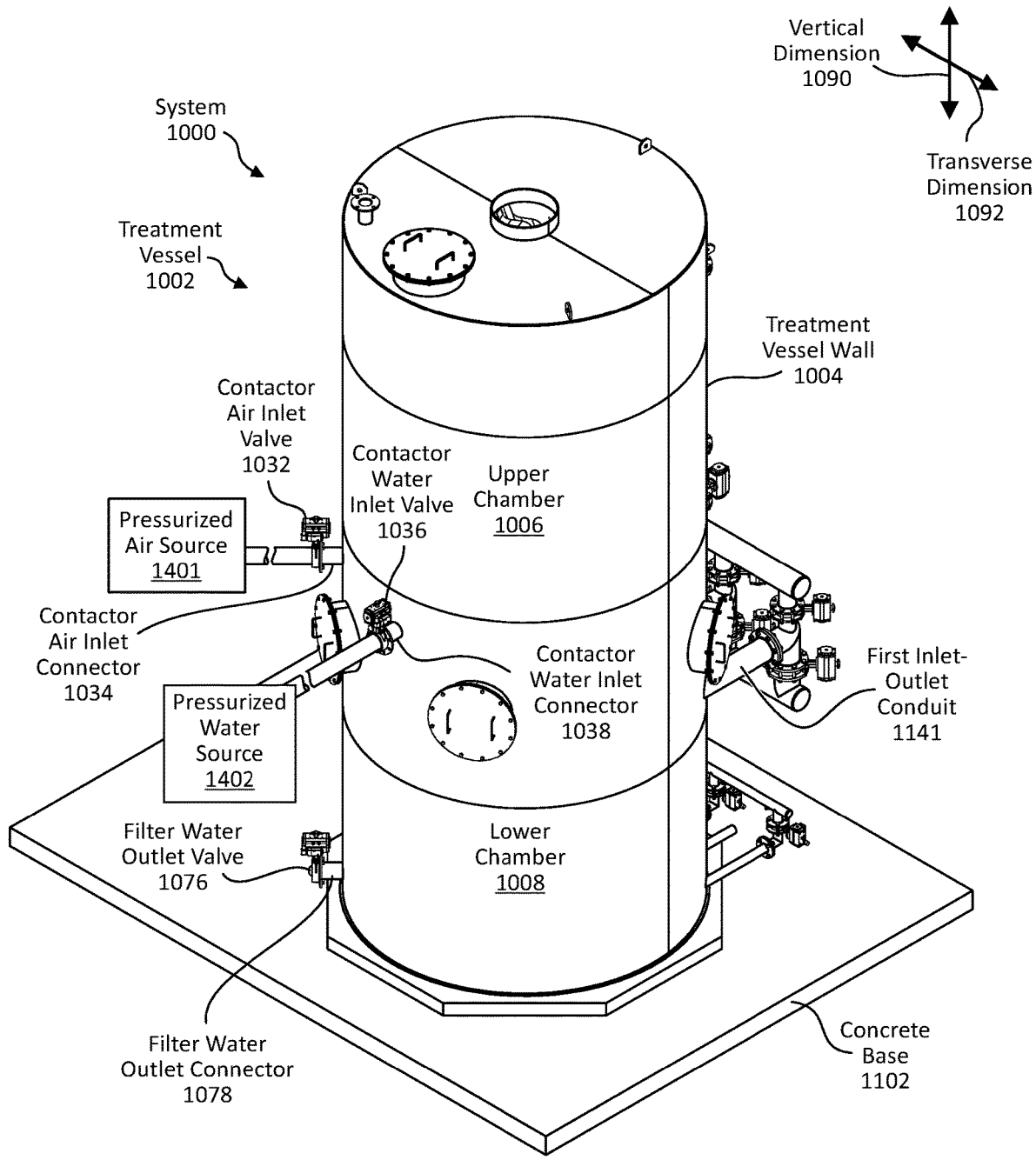
FIG. 2 is a rear perspective view of the embodiment of the system shown in FIG. 1.
Figure 3:
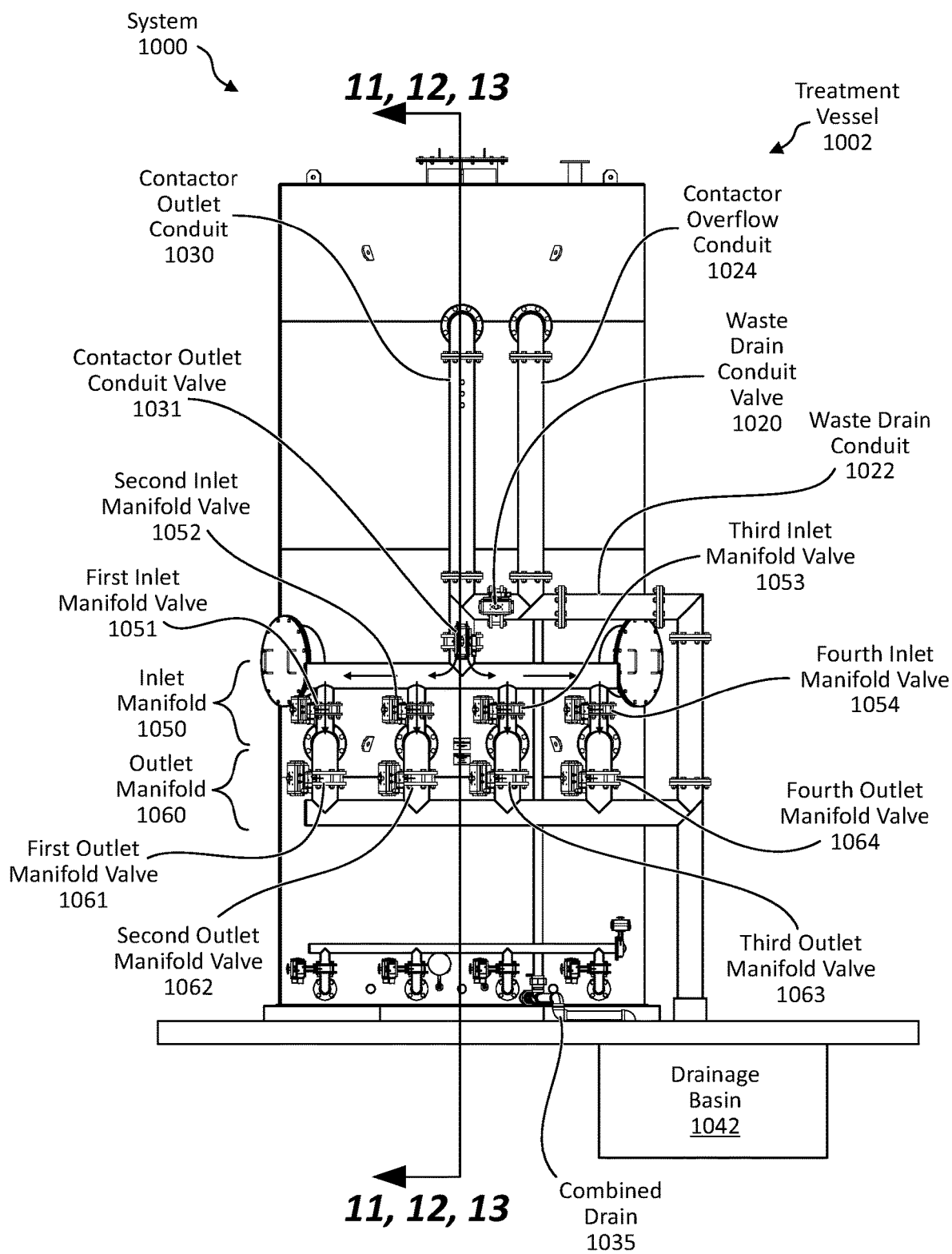
FIG. 3 is a front side elevational view of the embodiment of the system shown in FIG. 1.
Figure 4:
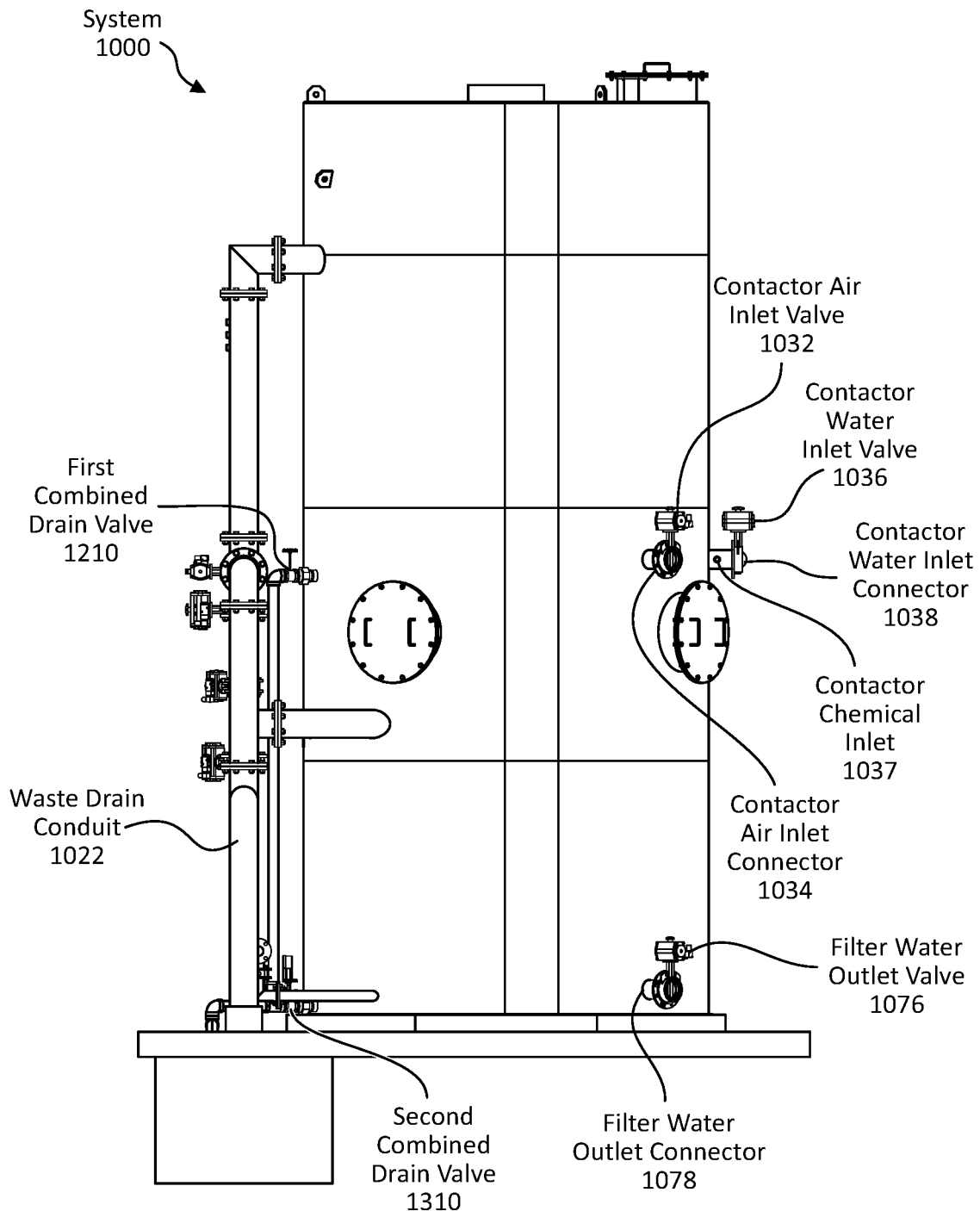
FIG. 4 is a right side elevational view of the embodiment of the system of FIG. 1.
Figure 6:
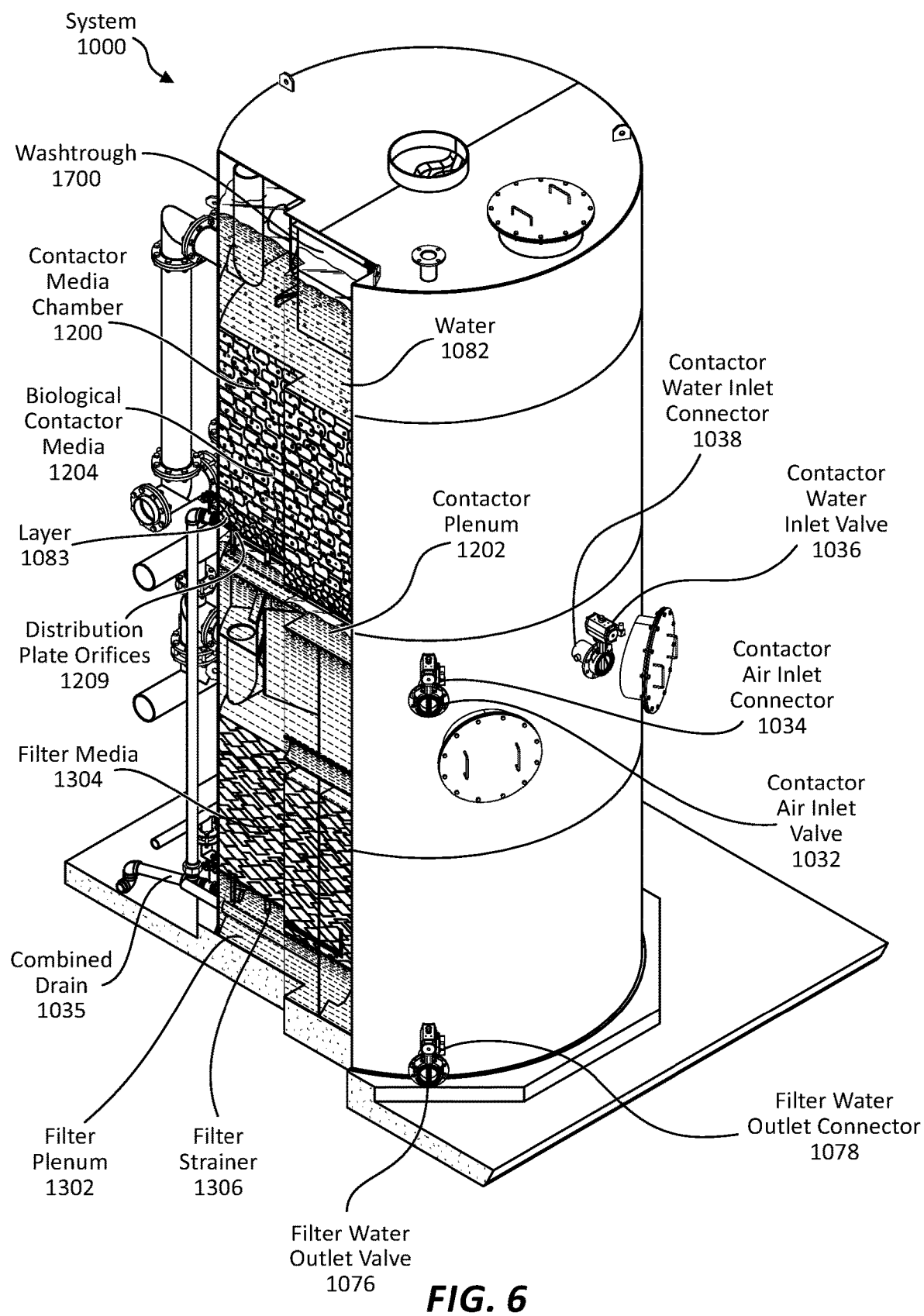
FIG. 6 comprises a right perspective cross-sectional view of the embodiment of the system of FIG. 1 taken across the line 6-6 in FIG. 9B.
Figure 7:
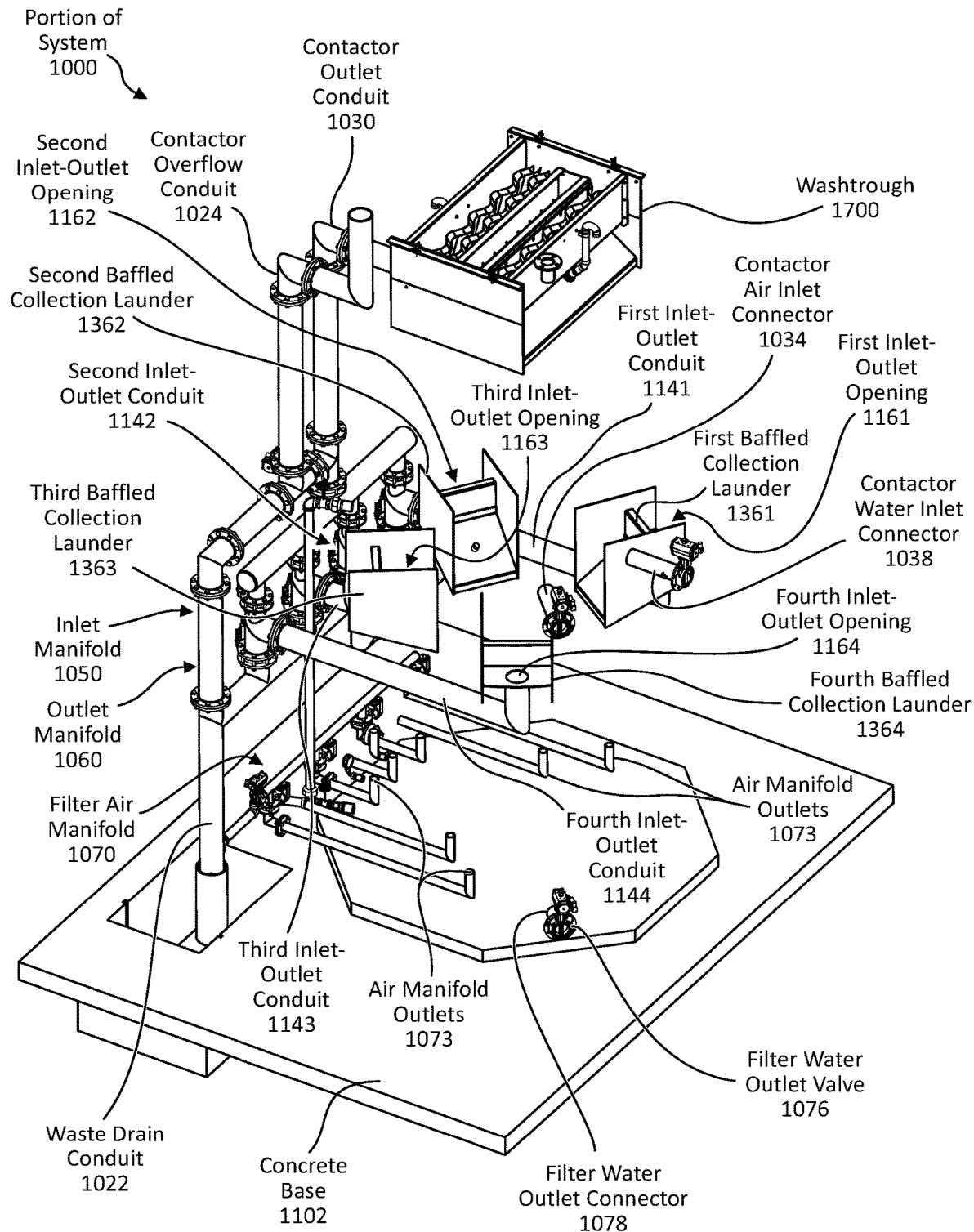
FIG. 7 is a right perspective view of the conduits, manifolds, washtrough, baffled collection launders, and concrete base of the embodiment of the system of FIG. 1.
Figure 8:
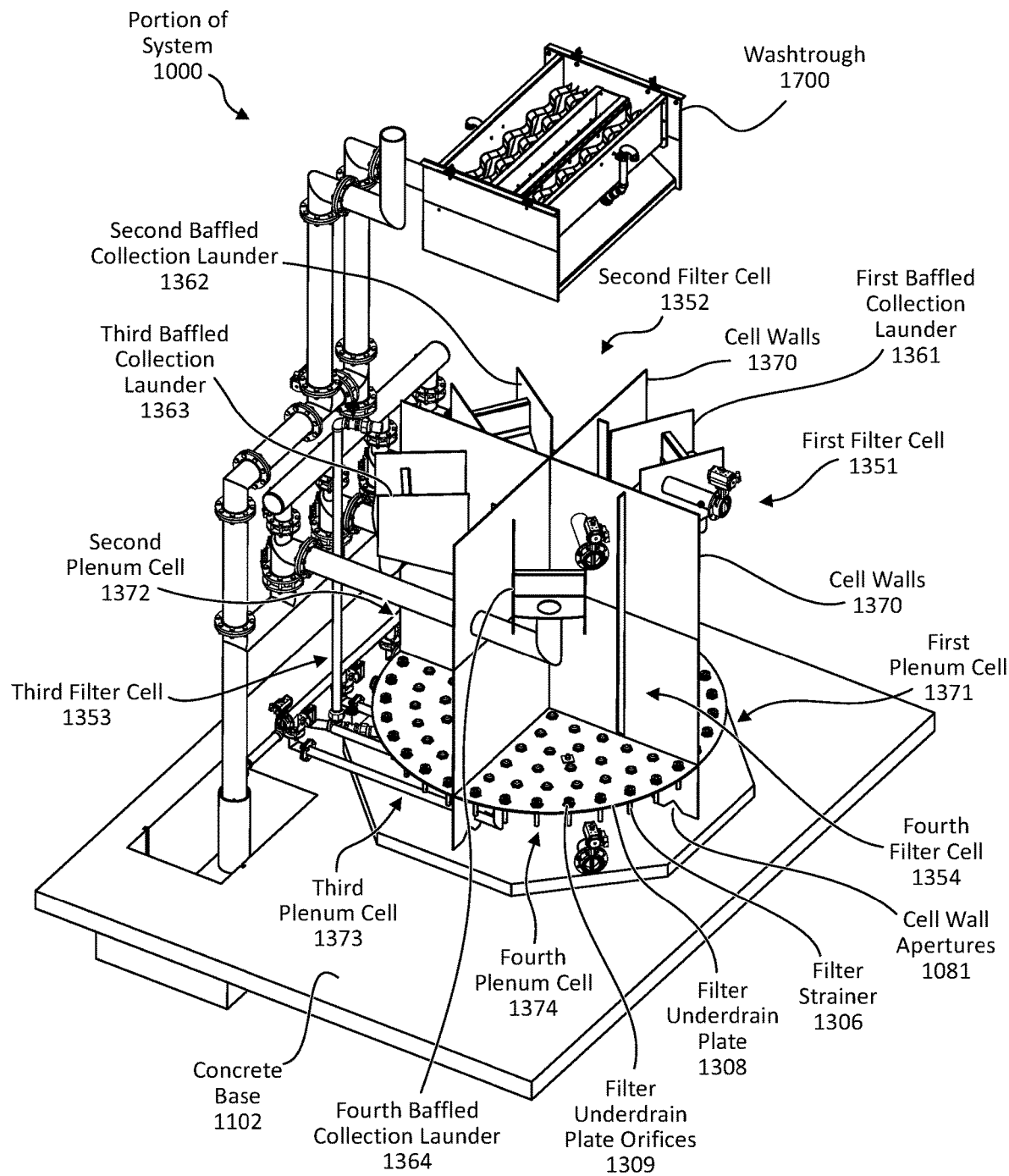
FIG. 8 is a right perspective view of the conduits, manifolds, cell walls, washtrough, baffled collection launders, filter underdrain plate and filter strainers of the embodiment of the system of FIG. 1.
Figure 9A:
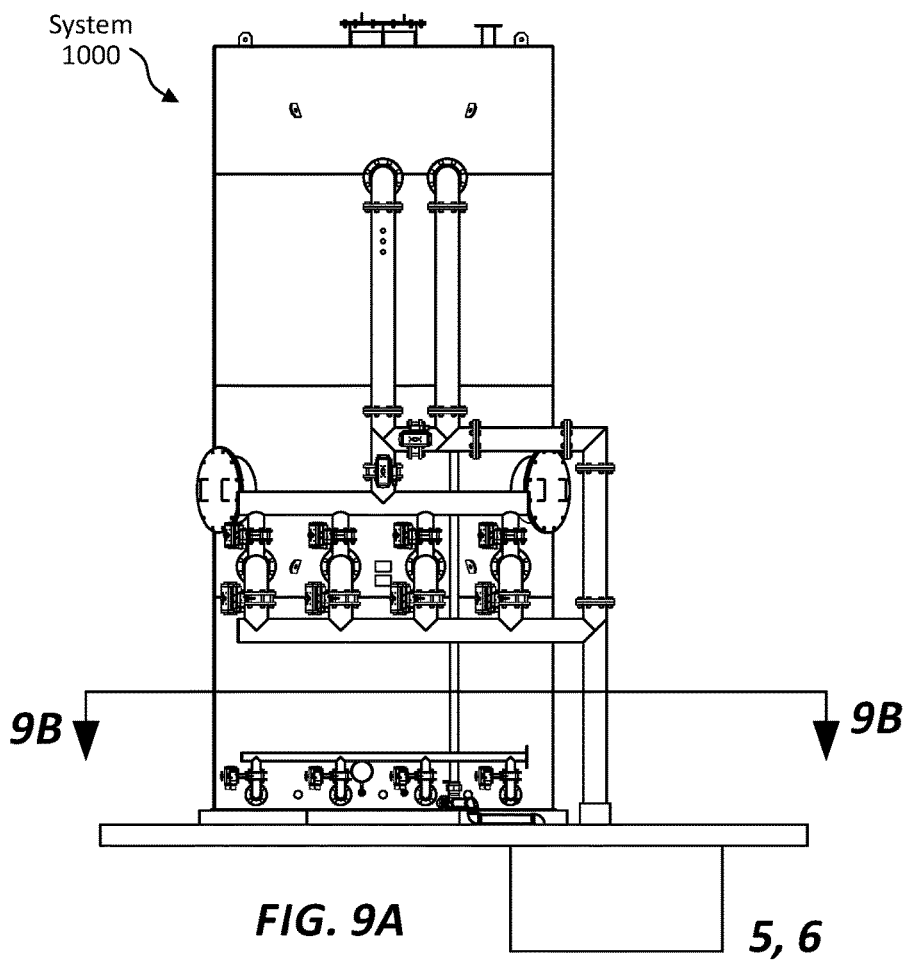
FIG. 9A is a front side elevational view of the embodiment of the system of FIG. 1.
Figure 9B:
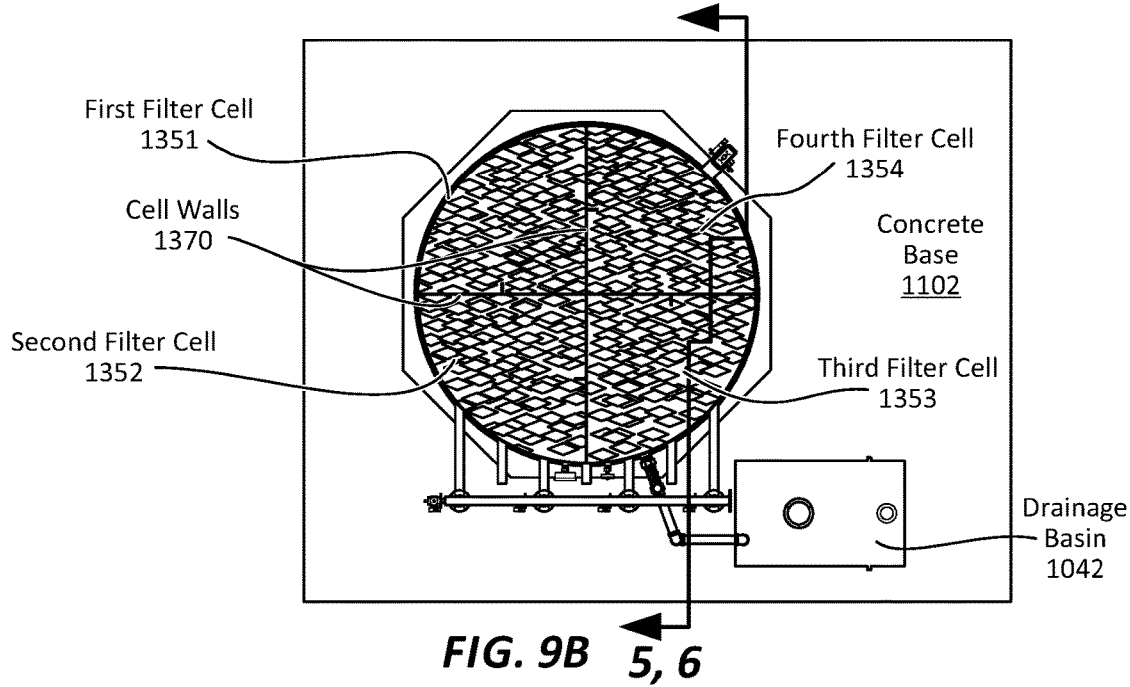
FIG. 9B is a top side, cross-sectional view of the embodiment of the system shown in FIG. 1 taken across the line 9B-9B in FIG. 9A.

In connection with this discussion, FIG. 1 is a front perspective view of one embodiment of a combination biological contactor and self-backwashing filter system 1000 for water treatment. FIG. 2 is a rear perspective view of the system 1000. FIG. 3 is a front side elevational view of the system 1000. FIG. 4 is a right side elevational view of the system 1000 of FIG. 1. FIG. 5 comprises a front perspective cross-sectional view of the system 1000 of FIG. 1. FIG. 6 comprises a right perspective cross-sectional view of the system 1000 of FIG. 1. FIG. 7 is a right perspective view of the conduits 1022, 1024, 1030, 1131, 1132, 1133, 1134, 1141, 1142, 1143, 1144, 1151, 1152, 1153, 1154, manifolds 1050, 1060, 1070, washtrough 1700, baffled collection launders 1361, 1362, 1363, 1364, and concrete base 1102 of the system 1000. FIG. 8 is a right perspective view of the conduits 1022, 1024, 1030, 1131, 1132, 1133, 1134, 1141, 1142, 1143, 1144, 1151, 1152, 1153, 1154, cell walls 1370, washtrough 1700, baffled collection launders 1361, 1362, 1363, 1364, filter underdrain plate 1308 and filter strainers 1306 of the system 1000. FIG. 9A is a front side elevational view of the system 1000. FIG. 9B is a top side, cross-sectional view of the system 1000.

The system 1000 includes a treatment vessel 1002. The treatment vessel 1002 comprises a treatment vessel wall 1004 and defines an upper chamber 1006 and a lower chamber 1008. A contactor filter divider plate 1212 separates the upper treatment chamber 1006 from the lower treatment chamber 1008. A filter base divider plate 1312 is disposed at an end of the system 1000 adjacent to the concrete base 1102. The system 1000 includes a vertical dimension 1090 and a transverse dimension 1092. When the system 1000 is in an installed orientation 1010, the vertical dimension 1090 is generally aligned with the Earth's gravitational pull, while the transverse dimension 1092 is generally perpendicular to Earth's gravitational pull. As used herein, the term "generally aligned" signifies within 15° of being perfectly aligned, while the term "generally perpendicular" signifies within 15° of being perfectly perpendicular.

When the system 1000 is an installed orientation 1010, the upper chamber 1006 is disposed above the lower chamber 1008 along the vertical dimension 1090. As illustrated in the figures, the upper chamber 1006 may be disposed immediately above the lower chamber 1008 or, alternatively, the upper chamber 1006 and lower chamber 1008 may be in nonaligned positions along the transverse dimension 1092.

The treatment vessel 1002 may include a treatment vessel wall 1004. The treatment vessel wall 1004 may comprise a plurality of components or a unitary component (e.g., integrally formed or joined together, such as by welding). In various embodiments, the treatment vessel wall 1004 is comprised of a plurality of components to facilitate transportation prior to assembly. One or more access hatches 1028 may be disposed within the treatment vessel wall 1004 to allow individuals to enter the treatment vessel 1002 and additionally to allow direct viewing of internal portions of the system 1000. In addition, a ladder 1098 may be disposed within the treatment vessel 1002 to allow movement within, for example, the upper chamber 1006.

In an installed orientation 1010, the treatment vessel 1002 may be positioned on a concrete base 1102 or another type of base to support the treatment vessel 1002.

In the illustrated first embodiment, an upflow biological contactor 1012 may be disposed within the upper chamber 1006, and a downflow granular media filter 1014 may be disposed within the lower chamber 1008.

The upflow biological contactor 1012 may comprise a contactor plenum 1202 separated from a contactor media chamber 1200 by a distribution plate 1208. The contactor plenum 1202 may be in fluid communication with the contactor media chamber 1200 via one or more contactor strainers 1206 disposed within the distribution plate 1208. Speaking broadly, the contactor strainers 1206 regulate the flow of water 1082 and air 1080 from the contactor plenum 1202 into the contactor media chamber 1200. In addition, the contactor strainers 1206 limit the flow of biological contactor media 1204 from the contactor media chamber 1200 into the contactor plenum 1202. Various embodiments of contactor strainers 1206 will be discussed in connection with FIGS. 10A/10B.

Air 1080 injected into the contactor media chamber 1200 enhances and enables the growth of the biology 1086 within the contactor media chamber 1200 on the biological contactor media 1204. The contactor strainers 1206 provide for a more even distribution of air 1080 within the contactor media chamber 1200 with the objective of providing more uniform growth of the biology 1086 throughout the chamber 1200. The term "air" 1080 should be broadly construed and, in various embodiments, the air 1080 may, for example, comprise atmospheric air (which comprises oxygen), liquid oxygen or purified oxygen (02) gas.

The upflow biological contactor 1012 may include biological contactor media 1204 disposed within a contactor media chamber 1200. A layer 1083 of gravel 1084 may be disposed within the contactor media chamber 1200 between the biological contactor media 1204 and the distribution plate 1208. The layer 1083 of gravel 1084 is included to mitigate the possibility of biological contactor media 1204 from passing through the contactor strainers 1206.

The contactor media 1204 may comprise, for example, expanded clay, ceramic media, granular activated carbon (GAC), char/biochar, anthracite coal, gravel and sand, and/or high-density material. GAC may be manufactured from coconut shell, bituminous coal or lignite coal. The high-density material may include, for example, garnet, ilmenite, pyrolusite or a combination of the foregoing. Biology 1086 may be disposed on and grow within the contactor media chamber 1200. The biology 1086 may, for example, reduce the amount of ammonia within water 1082 disposed within the contactor media chamber 1200.

The process of reducing ammonia within the water 1082 employing biology 1086 may involve a two-step process. This two-step process may involve oxidizing ammonia to nitrites and then oxidizing the nitrites to nitrates. The genera of biology 1086 involved in this first step may comprise, for example, *Nitrosomonas, Nitrosococcus* and *Nitrosospira*. Some subgenera, *Nitrosolobus* and *Nitrosovibrio*, can also autotrophically oxidize ammonia. The biology 1086 involved in the second step may comprise *Nitrobacter*, although other genera, including *Nitrospina, Nitrococcus*, and *Nitrospira* can also autotrophically oxidize nitrite.

Air 1080 may pass into the contactor plenum 1202 via a contactor air inlet connector 1034 from a pressurized air source 1401. Thus, the contactor plenum 1202 may be in controllable fluid communication with the pressurized air source 1401 employing a contactor air inlet valve 1032. Water 1082 may pass into the contactor plenum 1202 via the contactor water inlet connector 1038 from a pressurized water source 1402. Thus, the contactor plenum 1202 may be in controllable fluid communication with the pressurized water source 1402 employing a contactor water inlet valve 1036.

As used herein, the term "in fluid communication" signifies that two or more components or items are in either (1) direct fluid communication without using a one or more valves, or (2) controllable fluid communication employing one or more valves. As used herein, "controllable fluid communication" signifies that the flow of a fluid (e.g., air 1080 or water 1082) between two components or regions is controlled by a valve. As used herein, the term "valve" is used broadly to encompass any mechanism to increase, restrict, open, or shut off flow (e.g., a ball valve or remotely controllable valve), including pressure or flow alteration mechanisms (e.g., a pump).

Chemicals may also be injected into the contactor plenum 1202 via one or more contactor chemical inlets 1037. The injected chemicals may include chemicals, for example, to enhance or mitigate growth of biology 1086 within the contactor media chamber 1200, such as nutrients (e.g., phosphorus) or basic or acidic chemicals to adjust the pH of the water 1082.

A contactor outlet conduit 1030 may be in fluid communication with the contactor media chamber 1200 and an inlet manifold 1050. A washtrough 1700 may be disposed within the contactor media chamber 1200 at an end of the contactor outlet conduit 1030. The operation of the washtrough 1700 is disclosed, for example, in U.S. Pat. No. 5,779,895, which is incorporated herein in its entirety.

A contactor outlet conduit valve 1031 may control a flow of water 1082 from the contactor outlet conduit 1030 to the inlet manifold 1050. In addition, a waste drain conduit valve 1020 may control a flow of water 1082 from the contactor outlet conduit 1030 to a waste drain conduit 1022. The waste drain conduit 1022 may be in fluid communication, for example, with a drainage basin 1042. The waste drain conduit 1022 may also be in fluid communication with a contactor overflow conduit 1024. The contactor overflow conduit 1024 includes an open end disposed within the contactor media chamber 1200 that prevents (or at least mitigates the possibility) of the overflow of water 1082 from the contactor media chamber 1200.

The system 1000 may further comprise an air outlet 1026 disposed within the treatment vessel wall 1004 that allows air 1080 to exit the contactor media chamber 1200.

Filter chemical inlets 1033 may be disposed within the contactor outlet conduit 1030 to enable the injection of chemicals into the contactor outlet conduit 1030, which will ultimately pass into the downflow granular media filter 1014, including each of the filter cells 1351, 1352, 1353, 1354. Injected chemicals could include, for example, chlorine to inhibit the growth of biology 1086 within the downflow granular media filter 1014.

The inlet manifold 1050 may comprise a plurality of inlet manifold branches 1131, 1132, 1133, 1134 with each of the inlet manifold branches 1131, 1132, 1133, 1134 in controllable fluid communication with one of a plurality of inlet-outlet conduits 1141, 1142, 1143, 1144, employing at least one of a plurality of inlet manifold valves 1051, 1052, 1053,

1054. Each of the inlet-outlet conduits 1141, 1142, 1143, 1144 is in fluid communication with one of the filter cells 1351, 1352, 1353, 1354. For ease of reference, it should be noted that a first inlet manifold branch 1131 and a first inlet-outlet conduit 1141 is in controllable fluid communication with a first filter cell 1351 employing a first inlet manifold valve 1051; a second inlet manifold branch 1132 and a second inlet-outlet conduit 1142 is in controllable fluid communication with a second filter cell 1352 employing a second inlet manifold valve 1052; a third inlet manifold branch 1133 and a third inlet-outlet conduit 1143 is in controllable fluid communication with a third filter cell 1353 employing a third inlet manifold valve 1053; and a fourth inlet manifold branch 1134 and a fourth inlet-outlet conduit 1144 is in controllable fluid communication with a fourth filter cell 1354 employing a fourth inlet manifold valve 1054. Accordingly, for example, by closing the fourth inlet manifold valve 1054, a flow of water 1082 into the fourth filter cell 1354 may be reduced or shut off entirely.

The first inlet-outlet conduit 1141 includes a first inlet-outlet opening 1161 disposed within the first filter cell 1351; the second inlet-outlet conduit 1142 includes a second inlet-outlet opening 1162 disposed within the second filter cell 1352; the third inlet-outlet conduit 1143 includes a third inlet-outlet opening 1163 disposed within the third filter cell 1353; and the fourth inlet-outlet conduit 1144 includes a fourth inlet-outlet opening 1164 disposed within the fourth filter cell 1354. The inlet-outlet openings 1161, 1162, 1163, 1164 enable fluid (e.g., water 1082) to flow into and out of the pertinent filter cell 1351, 1352, 1353, 1354 via the pertinent inlet-outlet conduit 1141, 1142, 1143, 1144.

It should thus be noted that the contactor media chamber 1200 may be in controllable fluid communication with the downflow granular media filter 1014 (and each filter cell 1351, 1352, 1353, 1354) employing the first inlet manifold valve 1051, the second inlet manifold valve 1052, the third inlet manifold valve 1053, and the fourth inlet manifold valve 1054.

The system 1000 may further comprise an outlet manifold 1060. The outlet manifold 1060 may include a first outlet manifold branch 1151, a second outlet manifold branch 1152, a third outlet manifold branch 1153 and a fourth outlet manifold branch 1154. Each of the outlet manifold branches 1151, 1152, 1153, 1154 may be in controllable fluid communication with one of a plurality of the inlet-outlet conduits 1141, 1142, 1143, 1144 and a waste drain conduit 1022 employing at least one of a plurality of the outlet manifold valves 1061, 1062, 1063, 1064. Accordingly, the first outlet manifold valve 1061 controls the flow of water 1082 through the first outlet manifold branch 1151 to the waste drain conduit 1022; the second outlet manifold valve 1062 controls the flow of water 1082 through the second outlet manifold branch 1152 to the waste drain conduit 1022; the third outlet manifold valve 1063 controls the flow of water 1082 through the third outlet manifold branch 1153 to the waste drain conduit 1022; and the fourth outlet manifold valve 1064 controls the flow of water 1082 through the fourth outlet manifold branch 1154 to the waste drain conduit 1022.

Figure 12:
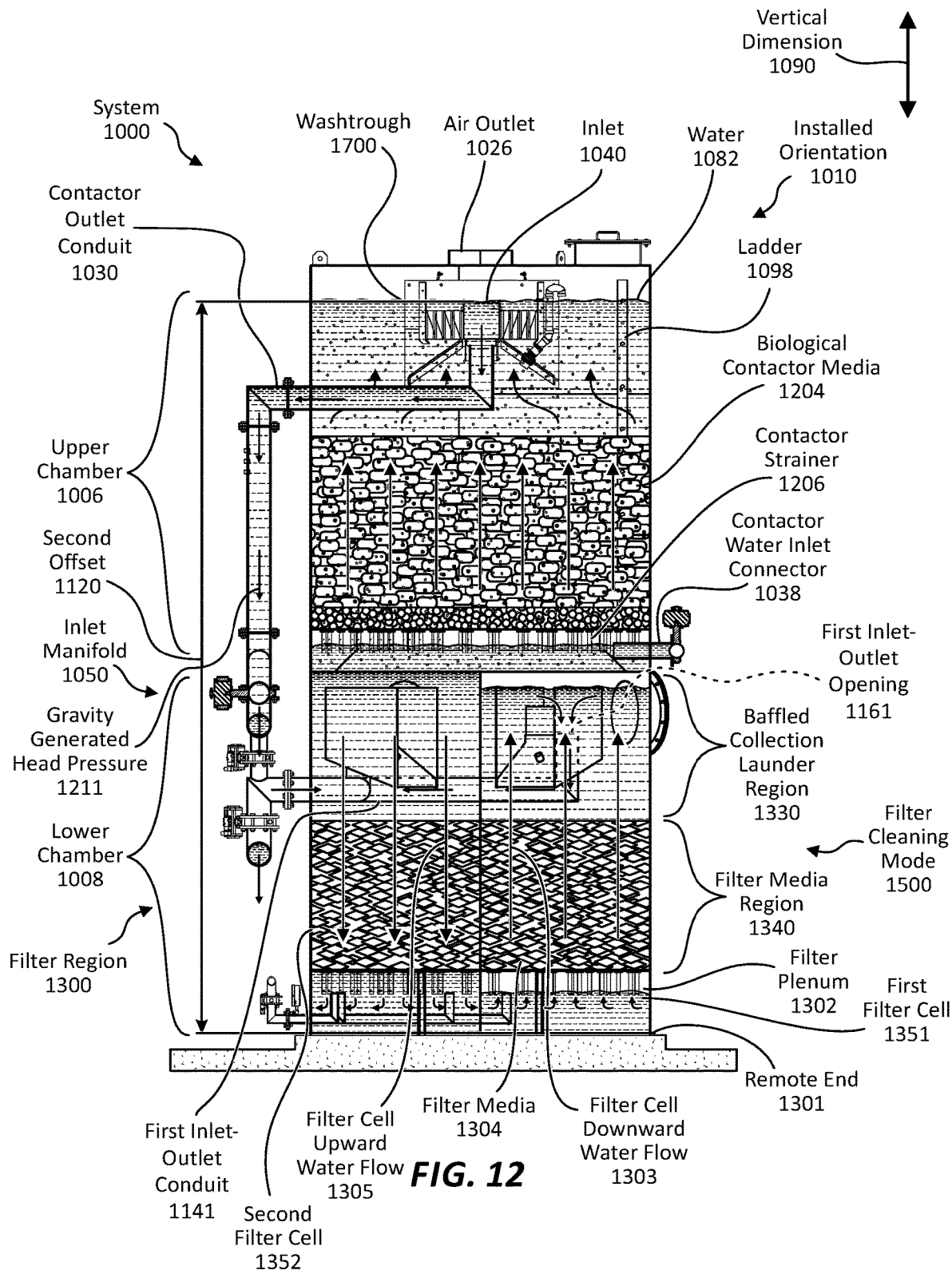
FIG. 12 comprises a right side elevational, cross-sectional view of the embodiment of the system shown in FIG. 1 taken across the line 12-12 in FIG. 3, illustrating the embodiment of the system in a filter cleaning mode.
Figure 13:
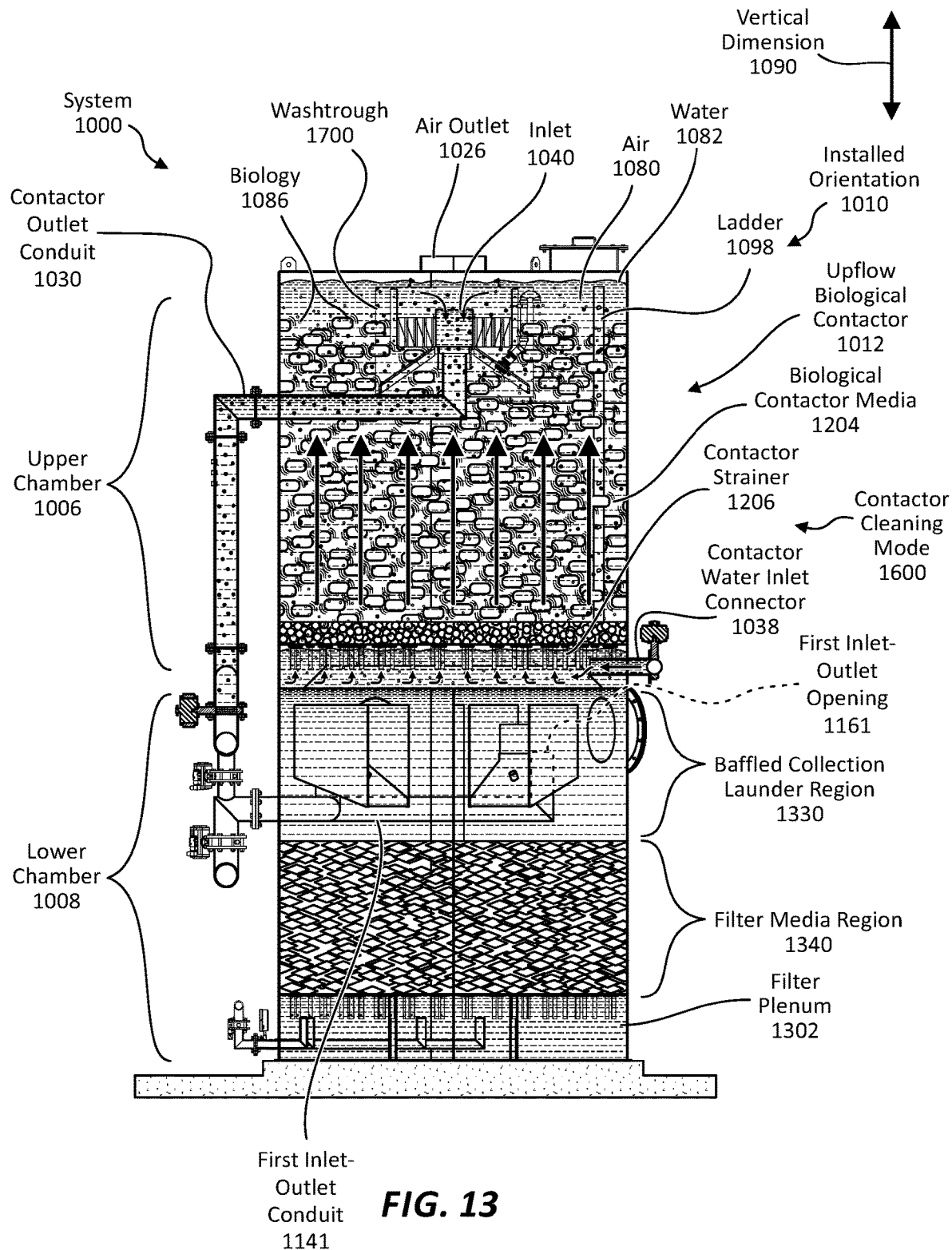
FIG. 13 comprises a right side elevational, cross-sectional view of the embodiment of the system shown in FIG. 1 taken across the line 13-13 in FIG. 3, illustrating the embodiment of the system in a contactor cleaning mode.

Baffled collection launders 1361, 1362, 1363, 1364 may be coupled to each one of the inlet-outlet conduits 1141, 1142, 1143, 1144 within the baffled collection launder region 1330 (shown and labeled with reference number(s) in FIGS. 12 and 13). A first baffled collection launder 1361 is coupled to a first inlet-outlet conduit 1141, a second baffled collection launder 1362 is coupled to a second inlet-outlet conduit 1142, a third baffled collection launder 1363 is coupled to the third inlet-outlet conduit 1143, and a fourth baffled collection launder 1364 is coupled to the fourth inlet-outlet conduit 1144. The baffled collection launders 1361, 1362, 1363, 1364 served to moderate and regulate the flow of water 1082 within, into and out of the downflow granular media filter 1014.

The filter cells 1351, 1352, 1353, 1354 are separated by cell walls 1370. The cell walls 1370 may extend from a filter region 1300 (which encompasses a baffled collection launder region 1330 and a filter media region 1340 (shown and labeled with reference number(s) in FIGS. 11-13)) into the filter plenum 1302. The filter plenum 1302 may be separated into filter plenum cells 1371, 1372, 1373, 1374 by the filter cell walls 1370. Within the filter plenum 1302, the cell walls 1370 may include a plurality of cell wall apertures 1081 (labeled only in FIG. 8) to allow water 1082 to flow between different plenum cells 1371, 1372, 1373, 1374 within the filter plenum 1302.

A filter air manifold 1070 may comprise a plurality of filter air manifold branches 1071 for controllably providing air 1080 to at least one plenum cell 1371, 1372, 1373, 1374 employing a plurality of filter air manifold branch valves 1072. Each of the filter air manifold branches 1071 may comprise an air manifold outlet 1073 disposed within one of the plenum cells 1371, 1372, 1373, 1374. The filter air manifold 1070 may also comprise a filter air manifold inlet 1074 that may be in fluid communication with a pressurized air source 1401. Air 1080, via the filter air manifold 1070, may be provided, for example, during a filter cleaning mode. In various embodiments, air 1080 is not provided to the downflow granular media filter 1014 during an operating mode and instead is provided during a filter cleaning mode, as will be explained subsequently.

A filter water outlet valve 1076 controls the flow of water 1082 (i.e., processed water 1082) out of the downflow granular media filter 1014 via the filter water outlet connector 1078.

A combined drain 1035 may be utilized to drain the upper chamber 1006 and the lower chamber 1008, as desired, employing a first combined drain valve 1210 (in fluid communication with the upper chamber 1006) and a second combined drain valve 1310 (in fluid communication with the lower chamber 1008).

The downflow granular media filter 1014 may include a plurality of filter cells 1351, 1352, 1353, 1354 within a filter region 1300. For example, in various embodiments, the plurality of filter cells 1351, 1352, 1353, 1354 comprise three or more filter cells 1351, 1352, 1353, 1354. The filter media 1304 removes impurities from the water 1082. The filter media 1304 may comprise, for example, sand only, anthracite only, expanded clay or ceramic media, a combination of sand and anthracite, or GreensandPlus™ produced by Inversand Company of Clayton, N.J.

A filter underdrain plate 1308 may be disposed between the filter media 1304 and the filter plenum 1302. Filter strainers 1306 may be disposed within the filter underdrain plate 1308. The filter strainers 1306 may regulate the flow of air 1080 into the filter region 1300 from the filter plenum 1302 during a filter cleaning mode 1500, which will be discussed subsequently. The filter strainers 1306 may also regulate the flow of water 1082 from the filter region 1300 into the filter plenum 1302. Filter strainers 1306 will be discussed subsequently in connection with FIGS. 10A-10B.

The system 1000 may further comprise a controller 1094. The controller 1094 may through a series of signals (e.g., wired electrical or wireless electrical signals or pneumatic signals) control the operation of the system 1000 through automation and/or remotely, as will be discussed subsequently in connection with FIGS. 11-13.

It should be noted that contactor strainers 1206 may be disposed within distribution plate orifices 1209 in the distribution plate 1208. In addition, filter strainers 1306 may be disposed within filter underdrain plate orifices 1309 within the filter underdrain plate 1308. In various embodiments the strainers 1206, 1306 may be omitted or may be present. Thus, in either case, the filter plenum 1302 may be in fluid communication with each of the filter cells 1351, 1352, 1353, 1354 via one or more filter underdrain plate orifices 1309 disposed within the filter underdrain plate 1308. Further, the contactor plenum 1202 may be in fluid communication with the contactor media chamber 1200 via one or more distribution plate orifices 1209 disposed within the distribution plate 1208.

FIGS. 10A-10B

FIG. 10A is a right side elevational view of a strainer 1206, 1306, while FIG. 10B is a rear perspective, cross-sectional view of a strainer 1206, 1306. The illustrated strainer 1206, 1306 may comprise a contactor strainer 1206 or a filter strainer 1306, which may be used in connection with the system 1000, as discussed above.

The strainers 1206, 1306 may be disposed within orifices 1209, 1309 within the distribution plate 1208 or filter underdrain plate 1308 with the orifices 1209, 1309 being sized to receive the strainers 1206, 1306. The strainers 1206, 1306 may comprise a plurality of spacers 1222 with intervening openings 1224. The strainers 1206, 1306 may further comprise a tailpipe member 1220 with one or more tailpipe member orifices 1226. In certain embodiments, the tailpipe member 1220 is omitted when air 1080 regulation is not desired or needed. The strainers 1206, 1306 may serve the purpose of regulating the flow of air 1080 and/or water 1082 through the strainer 1206, 1306. The strainers 1206, 1306 may further serve the purpose of limiting the flow of filter media 1304 or contactor media 1204 through the strainers 1206, 1306. Accordingly, the size of the openings 1224 may be altered to limit the passage of filter media 1304 or contactor media 1204 through the strainers 1206, 1306.

FIG. 11

Figure 11:
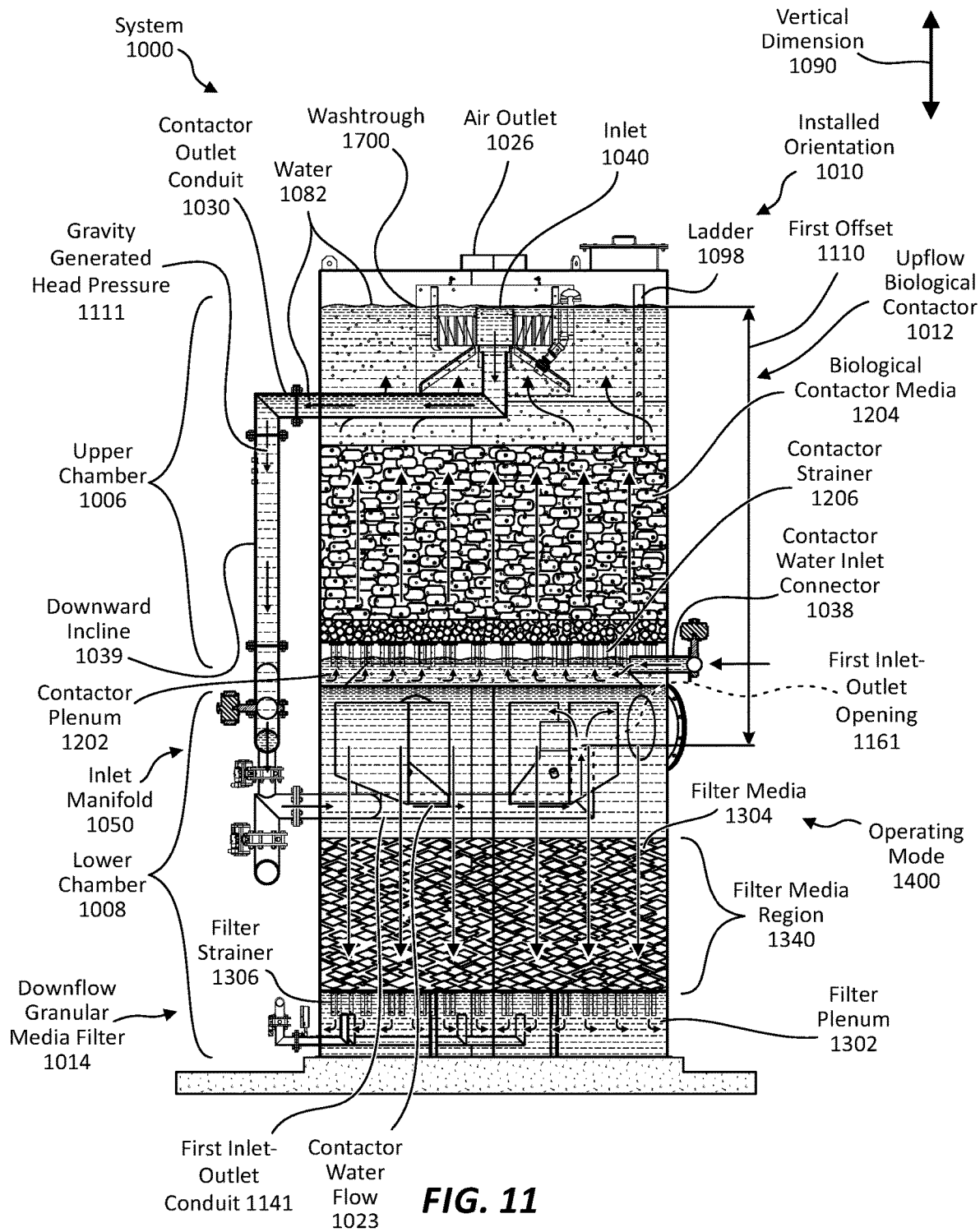
FIG. 11 comprises a right side elevational, cross-sectional view of the embodiment of the system shown in FIG. 1 taken across the line 11-11 in FIG. 3, illustrating the embodiment of the system in an operating mode.

FIG. 11 comprises a right side elevational, cross-sectional view of the system 1000 shown in FIG. 1 taken across the line 11-11 in FIG. 3, illustrating the system 1000 in an operating mode 1400. As illustrated in FIG. 11, the contactor outlet conduit 1030 includes a downward incline 1039 such that when the system 1000 is in the installed orientation 1010 and in an operating mode 1400 with water 1082 disposed in the contactor outlet conduit 1030, the water 1082 in the contactor outlet conduit 1030 is directed by gravity generated head pressure 1111 toward the inlet manifold 1050.

As illustrated in FIG. 11, the first inlet-outlet opening 1161 of a first inlet-outlet conduit 1141 is disposed within a first filter cell 1351 (shown and labeled with reference number(s) in FIGS. 8 and 9A).

The contactor outlet conduit 1030, the inlet manifold 1050, and the first inlet-outlet conduit 1141 are shaped to define a first offset 1110 along the vertical dimension 1090 between the inlet 1040 of the contactor outlet conduit 1030 and the first inlet-outlet opening 1161 such that when the system 1000 is in the installed orientation 1010 and in an operating mode 1400 with water 1082 disposed in the contactor outlet conduit 1030, gravity generated head pressure 1111 is sufficient to cause the water 1082 in the contactor outlet conduit 1030 to pass into the first filter cell 1351 (i.e., the contactor water flow 1023 from the first inlet-outlet conduit 1141) when all intervening valves 1031, 1051 (shown and labeled with reference number(s) in FIG. 3) are open. In various embodiments, the first offset 1110 may be at least 3 feet along the vertical dimension 1090, and is typically much more, such as 8 feet.

Accordingly, as illustrated in FIG. 11, no additional pumps or water-driving mechanisms are needed to transfer the water 1082 from the upflow biological contactor 1012 to the downflow granular media filter 1014. This configuration is advantageous in that it decreases the complexity, cost and maintenance needed for the system 1000.

The pressure 1111 needed to move the water 1082 into the filter cells 1351, 1352, 1353, 1354 (shown and labeled with reference(s) in FIG. 8) may vary depending on the degree of occlusion presented by particulate matter within the filter cells 1351, 1352, 1353, 1354. For example, if the filter cells 1351, 1352, 1353, 1354 are heavily laden with particulate matter (i.e., the foreign matters extracted from the water 1082) greater head pressure 1111 is required to direct the water 1082 through the filter cells 1351, 1352, 1353, 1354. If the filter cells 1351, 1352, 1353, 1354 have recently been cleaned, less head pressure 1111 is required. However, the system 1000 may include a mechanism or system for sensing the pressure 1111 or occlusion level and triggering the cleaning mode, as explained below in FIG. 12. Gravity generated head pressure 1111 required may also vary based on the type of filter media 1304 employed in the system 1000.

The system 1000 of FIG. 11, may further comprise a controller 1094 (shown and labeled with reference number(s) in FIG. 1) configured to open each of the inlet manifold valves 1051, 1052, 1053, 1054 (shown and labeled with reference number(s) in FIG. 3), to open the contactor air inlet valve 1032 (shown and labeled with reference number(s) in FIG. 2), to open the contactor water inlet valve 1036 (shown and labeled with reference number(s) in FIG. 2), to open the filter water outlet valve 1076 (shown and labeled with reference number(s) in FIG. 2), to close each of the outlet manifold valves 1061, 1062, 1063, 1064 (shown and labeled with reference number(s) in FIG. 3) and to close each of the filter air manifold branch valves 1072 (shown and labeled with reference number(s) in FIG. 1) during an operating mode 1400. Of course, in lieu of a controller 1094 one or more of these valves 1051, 1052, 1053, 1054, 1032, 1036, 1076, 1061, 1062, 1063, 1064, 1072 may be controlled manually rather than via a controller 1094.

As used herein, to "close" (including grammatical variants of the word "close") a valve signifies to maintain the valve in a closed position or to transition the valve to a closed position. Likewise, closing may comprise shutting off the volume of air 1080 or water 1082 passing through the pertinent valve, such as by shutting off the pressure 1111 of water 1082 or pressure of air 1080 supplied to the valve from an upstream source or by closing an upstream valve.

As used in this application, to "open" (including grammatical variants of the word "open") a valve signifies to maintain the valve in an open position or to transition the valve to an open position. It should be noted that "open" does not necessarily signify that a particular valve is fully open, only that the pertinent valve is not fully closed. In addition to altering the pertinent valve, opening may also comprise providing a volume of air 1080 or water 1082 passing through the pertinent valve (or increasing the flow of air 1080 or water 1082 through the valve), such as by increasing pressure of the supplied air 1080 or fluid provided by an upstream pressurized air source 1401 (shown and labeled with reference number(s) in FIG. 2) and/or the pressurized water source 1402 (shown and labeled with reference number(s) in FIG. 2).

FIG. 12

FIG. 12 comprises a right side elevational, cross-sectional view of the system 1000 shown in FIG. 1 taken across the line 12-12 in FIG. 3, illustrating the system 1000 in a filter cleaning mode 1500.

When the gravity generated head pressure 1211 is sufficiently high within the filter region 1300 (or when the flow rate into the filter region 1300 is sufficiently slow), a cleaning mode 1500 may be initiated (i.e., the filter media 1304 is sufficiently laden with impurities to make it difficult or cumbersome for water 1082 to pass through the filter region 1300). Accordingly, pressure or flow sensors may be disposed within the filter region 1300.

As noted above, a first inlet-outlet conduit 1141 comprises a first inlet-outlet opening 1161 disposed within a first filter cell 1351 (shown and labeled with reference number(s) in FIGS. 8 and 9B). The contactor outlet conduit 1030, the inlet manifold 1050, the first inlet-outlet conduit 1141 and first filter cell 1351 are shaped to define a second offset 1120 along the vertical dimension 1090 between an inlet 1040 of the contactor outlet conduit 1030 and a remote end 1301 of the first filter cell 1351 such that when the system 1000 is in the installed orientation 1010 and in a filter cleaning mode 1500 with water 1082 disposed in the contactor outlet conduit 1030, gravity generated head pressure 1211 is sufficient to cause the water 1082 in the contactor outlet conduit 1030 to pass down (i.e., the filter cell downward water flow 1303) through the first filter cell 1351 and up (i.e., the filter cell upward water flow 1305) through a second filter cell 1352 (shown and labeled with reference number(s) in FIGS. 5, 8 and 9B) when all intervening valves 1031, 1051 (shown and labeled with reference number(s) in FIG. 3) are open. In various embodiments, the second offset 1120 may be at least 5 feet along to the vertical dimension 1090 and is typically much more, such as 18 feet. As indicated previously, the pressure 1211 required may vary based on how heavily laden the filter cells 1351, 1352, 1353, 1354 (shown and labeled with reference number(s), e.g., in FIGS. 8 and 9B) are with impurities and/or types of filter media 1304 (shown and labeled with reference number(s) in FIG. 5).

A controller 1094 (shown and labeled with reference number(s) in FIG. 1) may be configured to close a first inlet manifold valve 1051 of the inlet manifold valves 1051, 1052, 1053, 1054 (shown and labeled with reference number(s) in FIG. 3) that controls a flow of water 1082 into a first filter cell 1351 of the filter cells 1351, 1352, 1353, 1354 and to open each remaining inlet manifold valve 1052, 1053, 1054 to open the contactor air inlet valve 1032 (shown and labeled with reference number(s) in FIG. 2), to open the contactor water inlet valve 1036 (shown and labeled with reference number(s) in FIG. 2), to close the filter water outlet valve 1076 (shown and labeled with reference number(s) in FIG. 2), to open a first outlet manifold valve 1061 of the outlet manifold valves 1061, 1062, 1063, 1064 (shown and labeled with reference number(s) in FIG. 3) that controls a flow of water 1082 from the first filter cell 1351 of the filter cells 1351, 1352, 1353, 1354 and to close each remaining outlet manifold valve 1062, 1063, 1064 during a filter cleaning mode 1500. Thus, it should be noted that the water 1082 may flow down 1303 each of the second filter cell 1352, third filter cell 1353, and fourth filter cell 1354 and flow upward 1305 through the first filter cell 1351 in the filter cleaning mode 1500. Depending on which of the filter cells 1351, 1352, 1353, 1354 is being cleaned, water 1082 will flow upward 1305 through the filter cell 1351, 1352, 1353, 1354 being cleaned and downward through the remaining filter cells 1351, 1352, 1353, 1354.

FIG. 13

FIG. 13 comprises a right side elevational, cross-sectional view of the system 1000 shown in FIG. 1 taken across the line 13-13 in FIG. 3, illustrating the system 1000 in a contactor cleaning mode 1600.

The contactor cleaning mode 1600 may be initiated in order to, for example, mitigate the overgrowth of biology 1086 by increasing the flow of water 1082 and/or air 1080 into the contactor media chamber 1200. The increased flow of water 1082 and/or air 1080 agitates the biological contactor media 1204 to dislodge excess biology 1086 and allow extraction of the excess biology 1086, while retaining the contactor media 1204 employing the washtrough 1700.

As indicated previously, the system 1000 may comprise a contactor outlet conduit valve 1031 (shown and labeled with reference number(s) in FIG. 3) disposed within the contactor outlet conduit 1030 to control passage of water 1082 into the inlet manifold 1050, and a waste drain conduit 1022 (shown and labeled with reference number(s) in FIGS. 3 and 4) in controllable fluid communication with the contactor outlet conduit 1030 employing a waste drain conduit valve 1020 (shown and labeled with reference number(s) in FIG. 3).

The system 1000 of FIG. 13 may comprise a controller 1094 (shown and labeled with reference number(s) in FIG. 1) configured to open the contactor air inlet valve 1032 (shown and labeled with reference number(s) in FIG. 2), to open the contactor water inlet valve 1036 (shown and labeled with reference number(s) in FIG. 2), to close the contactor outlet conduit valve 1031 (shown and labeled with reference number(s) in FIG. 2), to open the waste drain conduit valve 1020, to alter at least one of the pressurized air source 1401 (shown and labeled with reference number(s) in FIG. 2) to increase a flow of air 1080 through the contactor air inlet valve 1032 and the pressurized water source 1402 (shown and labeled with reference number(s) in FIG. 2) to increase a flow of water 1082 through the contactor water inlet valve 1036, and to close each of the filter air manifold branch valves 1072 (shown and labeled with reference number(s) in FIG. 1) during a contactor cleaning mode 1600 for the upflow biological contactor 1012.

Tables 1 and 2 provided below comprise illustrative, nonlimiting information related to operation of the upflow biological contactor 1012.

TABLE 1

| Media Type | Typical Bulk Density (lbs/cu ft) | Size Range | Typical Size | Water Rate in the Operating Mode (gpm/sq ft) | Empty Bed Contact Time (min) | Air Rate in Operating Mode (cfm/sq ft) |
|---|---|---|---|---|---|---|
| Expanded clay or ceramic media | 34 to 50 | 1 to 5 mm | 2 mm | 1 to 5 2 typical | 10 to 20 15 typical | 1 to 4 3 typical |
| Granular Activated Carbon (GAC) | 15 to 40 | 1 to 4 mm | 2 mm | 1 to 5 2 typical | 10 to 20 15 typical | 1 to 4 3 typical |
| Char/Biochar | 15 to 50 | 1 to 5 mm | 2 mm | 1 to 5 2 typical | 10 to 20 15 typical | 1 to 4 3 typical |
| Anthracite coal | 50 to 55 | 1 to 3 mm | 2 mm | 1 to 5 2 typical | 10 to 20 15 typical | 1 to 4 3 typical |
| Gravel and sand | 100 to 110 | 1 to 6 mm | 2 mm | 1 to 5 2 typical | 10 to 20 15 typical | 1 to 4 3 typical |
| High-density material Support Material | 120 to 150 | 1 to 2 mm | 1.6 mm | 1 to 5 2 typical | 10 to 20 15 typical | 1 to 4 3 typical |
| Gravel | 100-110 | ¼ to 1 inch | ½ inch | Not Applicable | Not Applicable | Not Applicable |

TABLE 2

| Media Type | Water Rate in the Contactor Cleaning Mode (gpm/sqft) | Air Rate in the Contactor Cleaning Mode (cfm/sqft) |
|---|---|---|
| Expanded clay or ceramic media | 4 to 8 5 typical | 3 to 4 3 Typical |
| Granular Activated Carbon (GAC) | 4 to 8 5 typical | 3 to 4 3 Typical |
| Char/Biochar | 4 to 8 5 typical | 3 to 4 3 Typical |
| Anthracite coal | 4 to 10 5 Typical | 3 to 4 3 Typical |
| Gravel and sand | 5 to 12 6 Typical | 3 to 6 3 Typical |
| High-density material Support Material | 6 to 14 8 Typical | 3 to 6 3 Typical |
| Gravel | Not Applicable | Not Applicable |

Table 3 provided below comprises illustrative, nonlimiting information related to operation of the downflow granular media filter 1014.

TABLE 3

| Media Type | Typical Effective Size Applied | Maximum Effective Size Range | Filtration Loading Rates | BW Cleaning Rates |
|---|---|---|---|---|
| Sand Only | 0.45-0.55 mm | 0.30-0.8 mm | 4 gpm/sqft (all cells in service) with a minimum of 0.5 gpm/sqft (all cells in service) | 3-8 gpm/sqft of water with 2-3 scfm/sqft of air |
| Anthracite only | 0.6-0.8 mm | 0.30-0.8 mm | 4 gpm/sqft (all cells in service) with a minimum of 0.5 gpm/sqft (all cells in service) | 3-8 gpm/sqft of water with 2-3 scfm/sqft of air |
| Expanded clay or ceramic media only | 0.6-0.8 mm | 0.30-0.8 mm | 4 gpm/sqft (all cells in service) with a minimum of 0.5 gpm/sqft (all cells in service) | 3-8 gpm/sqft of water with 2-3 scfm/sqft of air |
| Dual Media (sand and anthracite) | 0.45-0.55 mm sand 0.8-1.0 mm anthracite | 0.30-0.8 mm sand 0.6-1.2 mm anthracite | 4 gpm/sqft (all cells in service) with a minimum of 0.5 gpm/sqft service) | 3-15 gpm/sqft of water with 2-3 scfm/sqft of (all cells in air service) |

TABLE 3-continued

| Media Type | Typical Effective Size Applied | Maximum Effective Size Range | Filtration Loading Rates | BW Cleaning Rates |
|---|---|---|---|---|
| GreensandPlus ™ | 0.30-0.35 mm | 0.30-0.35 mm | 4 gpm/sqft (all cells in service) with a minimum of 0.5 gpm/sqft (all cells in service) | 3-8 gpm/sqft of water with 2-3 scfm/sqft of air |

In the foregoing tables, "lbs/cuft" refers to pounds per cubic foot; "gpm/sqft" refers to gallons per minute per square foot; "min" refers to minutes; "cfm/sqft" refers to cubic feet per minute per square foot; and "scfm/sqft" refers to standard cubic feet per minute per square foot.

Second Embodiment

FIGS. 14A-17D illustrate various views of a second embodiment of a combination biological contactor and self-backwashing filter system 2000 for water treatment or portions thereof. The second embodiment of the system 2000 operates in a similar manner to the first embodiment of the system 1000 with the exception that the system 2000 of the second embodiment does not include a filter plenum 1302 or a contactor plenum 1202. Thus, the structural mechanisms for injecting air 1080 and water 1082 into the contactor media chamber 2200 in the operating mode 1400, filter cleaning mode 1500, and contactor cleaning mode 1600 (shown and labeled with reference number(s) in FIGS. 11-13) are different. Also, the mechanisms for injecting air 1080 into the filter region 2300 in a filter cleaning mode 1500 and for extracting water 1082 from the filter region 2300 in the operating mode 1400 are different. However, steps and procedures (i.e., the timing of opening and closing of the various valves 1020, 1031, 1032, 1036, 1051, 1052, 1053, 1054, 1061, 1062, 1063, 1064, 1072, 1076 is identical) in each of the modes 1400, 1500, 1600.

It should be noted that the pressurized air source 1401 and pressurized water source 1402 are only included once in the figures to simplify the drawings, but would be present in an operating version of the disclosed subject matter. By way of definition, however, the pressurized air source 1401 and pressurized water source 1402 comprise optional portions of the disclosed system 2000. Likewise, a controller 2094, for example, comprises an optional portion of the system 2000 because the system 2000 may be manually operated. Also, a legend is presented in FIG. 14B, but is applicable to pertinent versions of all of the figures including the symbols in the legend in connection with the first embodiment of the system 1000.

Figure 14A:
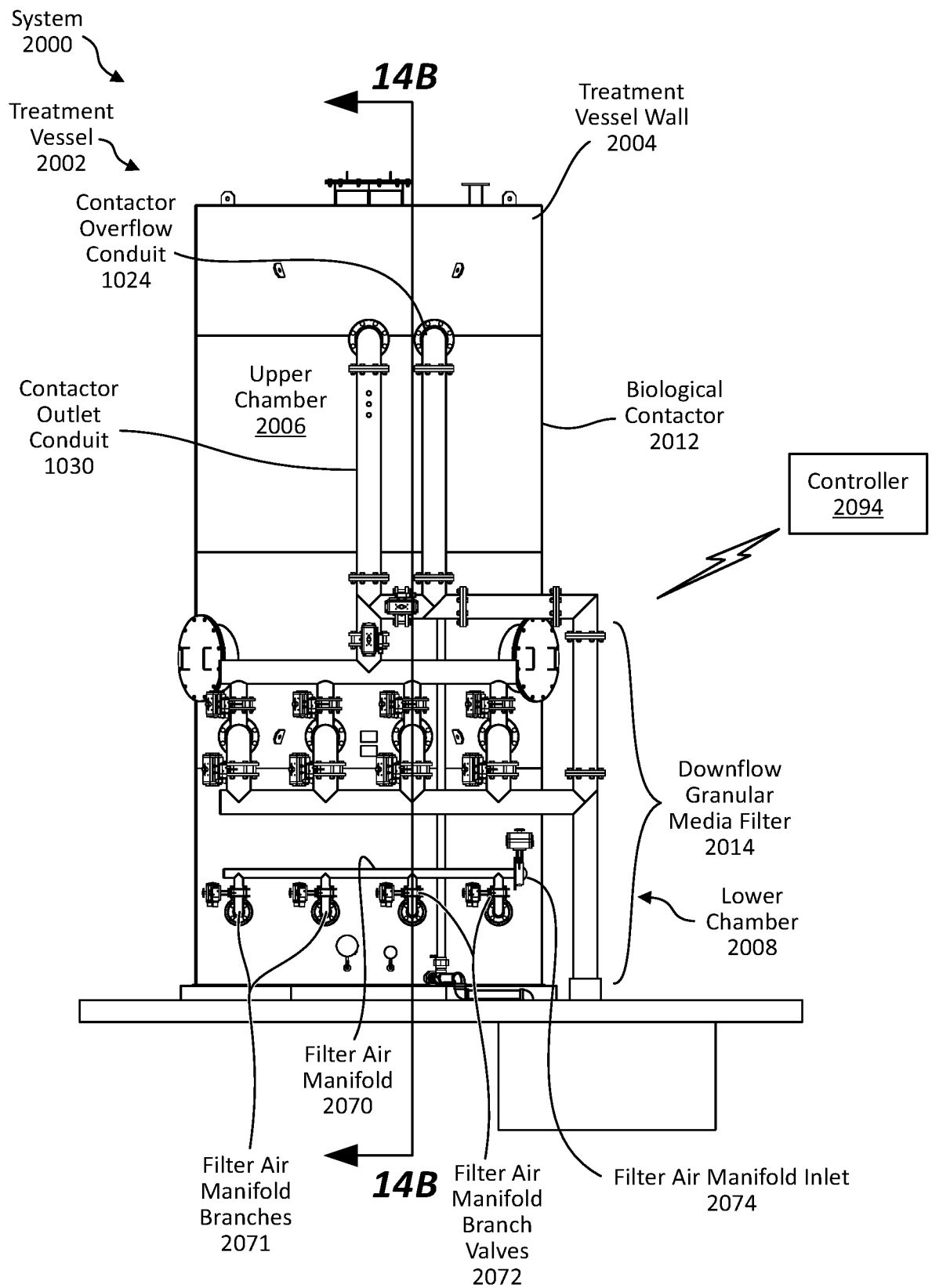
FIG. 14A is a front side elevational view of a second embodiment of a combination biological contactor and self-backwashing filter system for water treatment.
Figure 14B:
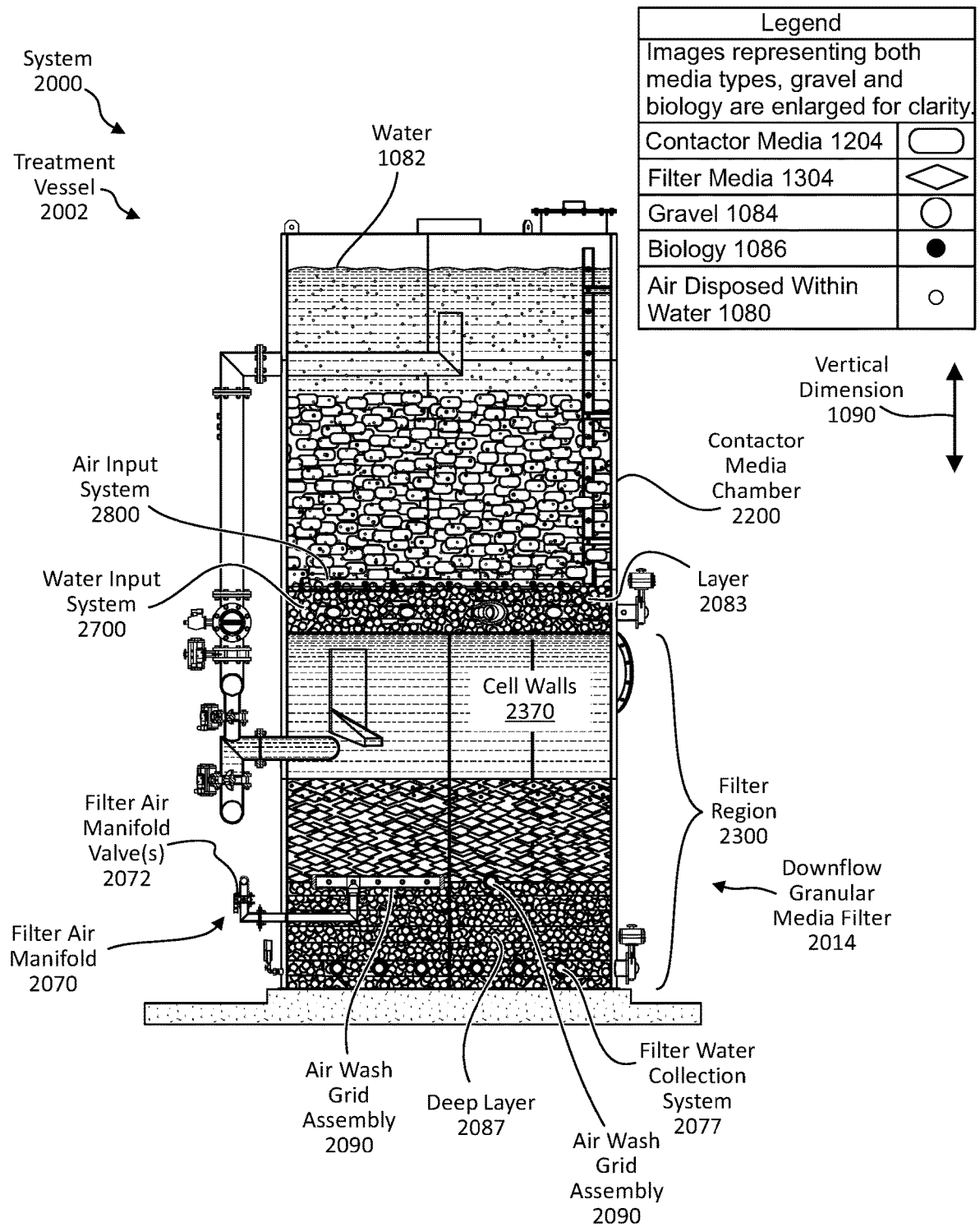
FIG. 14B comprises a right side elevational, cross-sectional view of the embodiment of the system shown in FIG. 14A taken across the line 14B-14B in FIG. 14A.

Air 1080 is depicted in the figures with a circular shape when the air 1080 is disposed within water 1082, as indicated in the legend of FIG. 14B. However, air 1080 would also be present at various other locations within the system 2000 and is represented as whitespace within the treatment vessel 2002 (e.g., above the water 1082 within the contactor media chamber 2200 when the system 1000 is positioned in an installed orientation 2010 and operating).

In the second embodiment of the system 2000, the following components, for example, may be the same or substantially the same as the first embodiment of the system 1000: waste drain conduit valve 1020, waste drain conduit 1022, contactor overflow conduit 1024, air outlet 1026, access hatches 1028, contactor outlet conduit 1030, contactor outlet conduit valve 1031, contactor air inlet valve 1032, filter chemical inlets 1033, contactor air inlet connector 1034, combined drain 1035, contactor water inlet valve 1036, contactor chemical inlet 1037, contactor water inlet connector 1038, contactor outlet conduit downward incline 1039, inlet 1040 of the contactor outlet conduit 1030, drainage basin 1042, inlet manifold 1050, inlet manifold valves 1051, 1052, 1053, 1054, inlet-outlet openings 1161, 1162, 1163, 1164, outlet manifold 1060, outlet manifold valves 1061, 1062, 1063, 1064, air 1080, water 1082, vertical dimension 1090, transverse dimension 1092, controller 1094, ladder 1098, concrete base 1102, first offset 1110, gravity generated head pressure 1111, 1211, second offset 1120, inlet manifold branches 1131, 1132, 1133, 1134, inlet-outlet conduits 1141, 1142, 1143, 1144, outlet manifold branches 1151, 1152, 1153, 1154, biological contactor media 1204, first combined drain valve 1210, contactor filter divider plate 1212, second combined drain valve 1310, filter base divider plate 1312, baffled collection launder region 1330, filter media region 1340, filter cells 1351, 1352, 1353, 1354, baffled collection launders 1361, 1362, 1363, 1364, cell walls 1370, pressurized air source 1401, pressurized water source 1402, and washtrough 1700. In order to simplify the figures in connection with the system 2000 and to focus on the distinguishing features of the system 2000 with respect to the system 1000, only a few of these components will be labeled in the figures of the second embodiment. Likewise, the functions and operation of these features will not be recited again—although they will operate in the same manner as explained in the first embodiment of the system 1000.

FIGS. 14A-16

Figure 15:
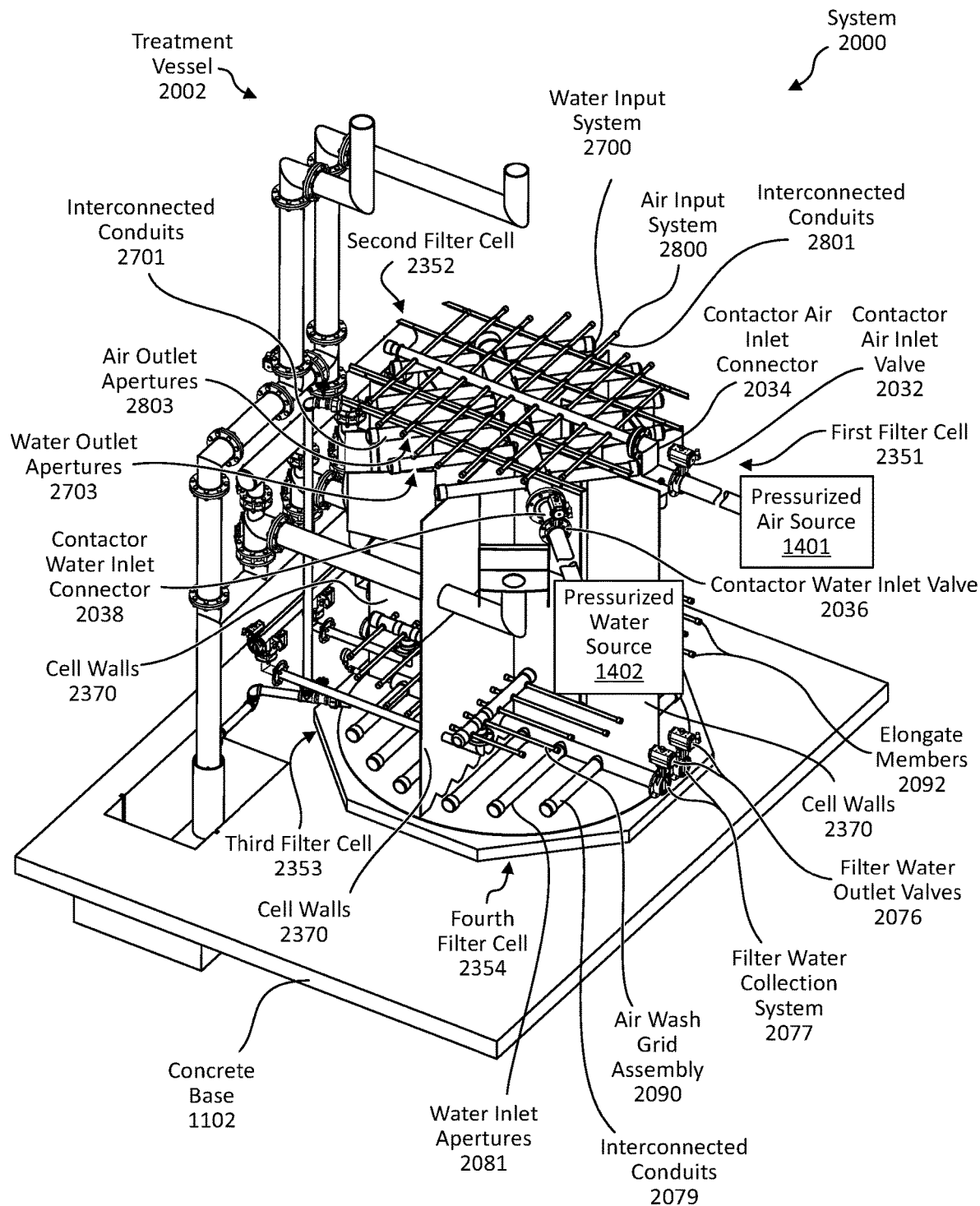
FIG. 15 is a right perspective view of the conduits, manifolds, air input system, water input system, launders, cell walls, air wash grid assemblies, filter water collection system, and concrete base of the embodiment of the system of FIG. 14A.
Figure 16:
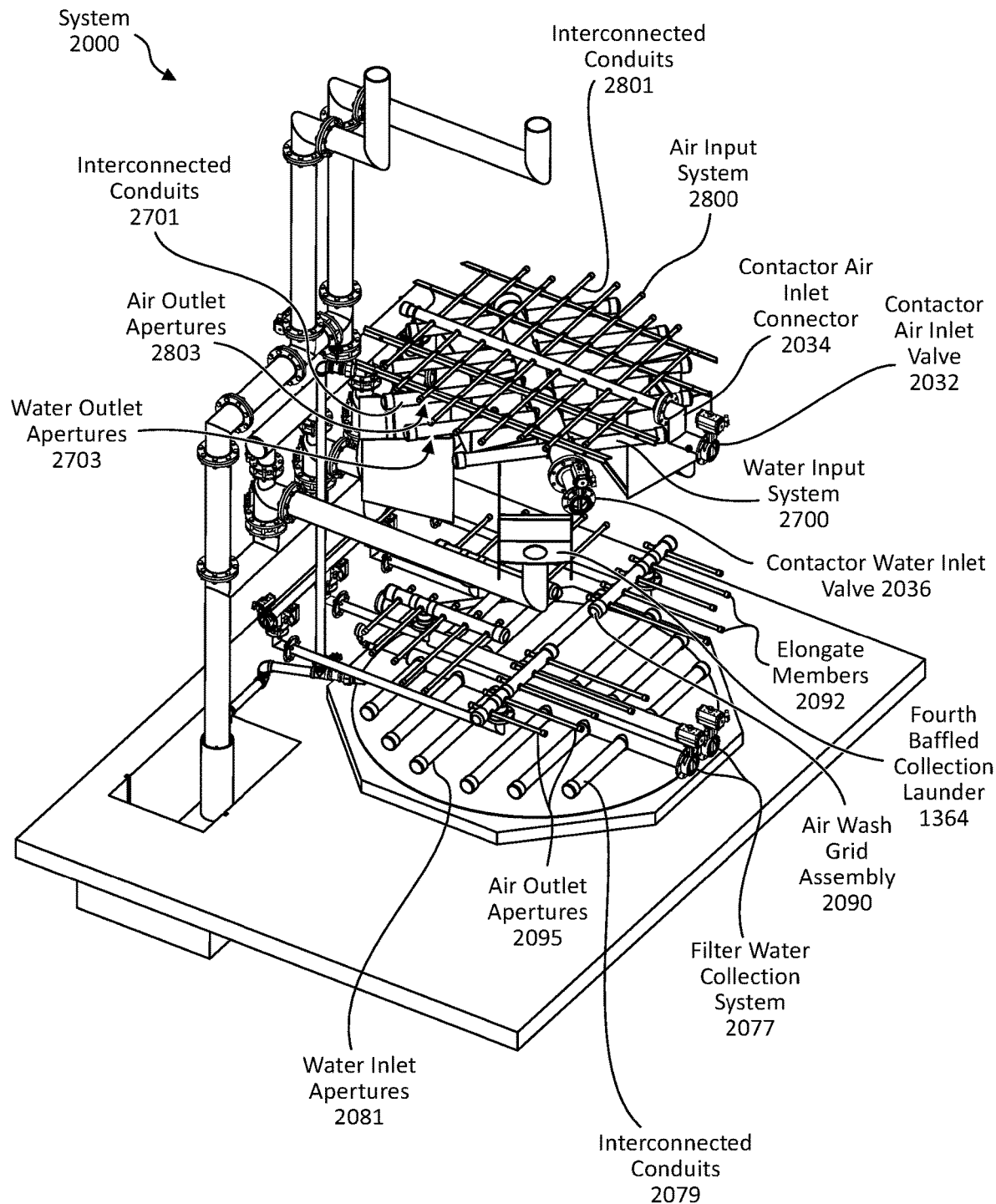
FIG. 16 is a right perspective view of the conduits, air input system, water input system, launders, air wash grid assemblies, filter water collection system, and concrete base of the embodiment of the system of FIG. 14A.
Figure 17A:
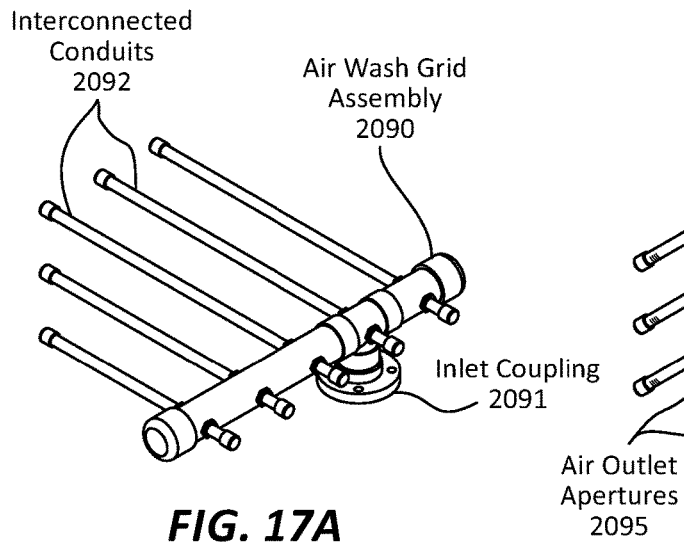
FIG. 17A-17D comprise various perspective and side views of an air wash grid assembly of the embodiment of the system of FIG. 14A.
Figure 17B:
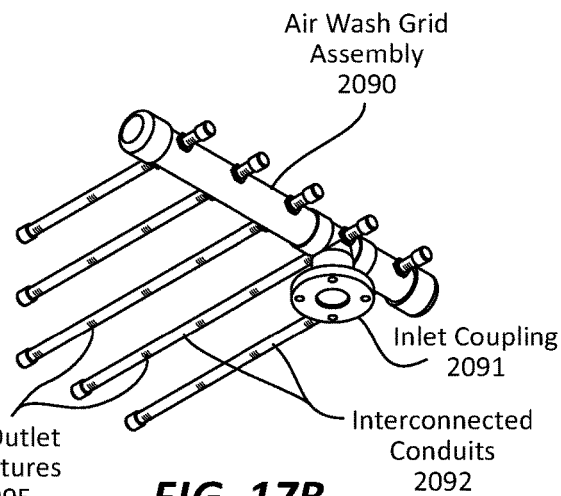
Figure 17C:
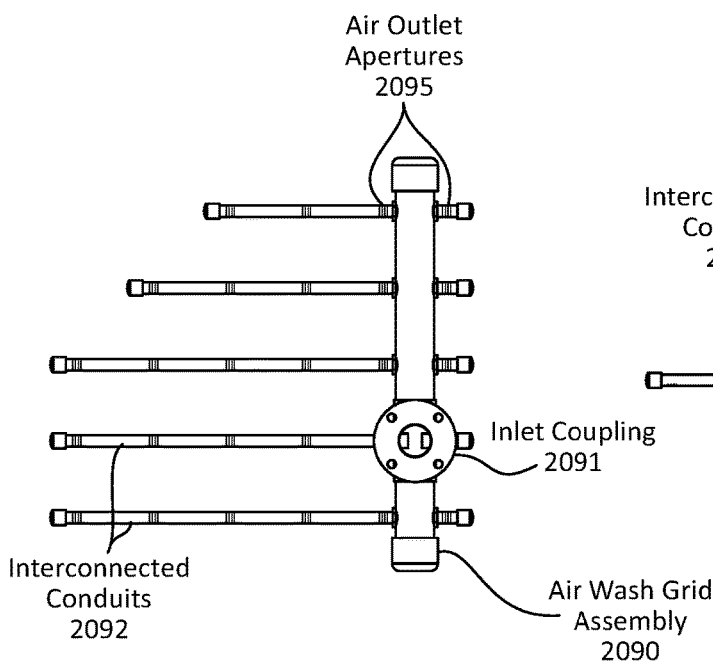
Figure 17D:
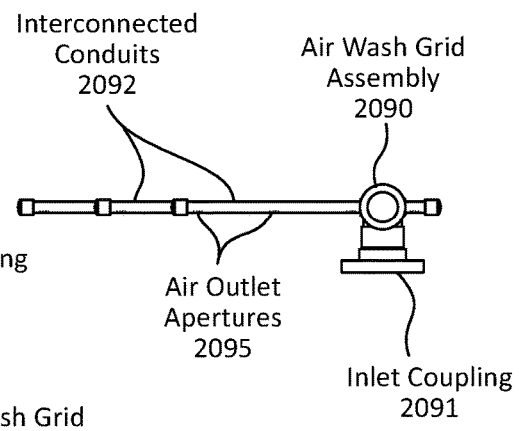

FIGS. 14A-16 will be discussed concurrently. Part numbers utilized in this discussion will be included in at least one of FIGS. 14A-16, but not necessarily in each of these figures FIG. 14A is a front side elevational view of an alternative embodiment of a combination biological contactor and self-backwashing filter system 2000 for water treatment. FIG. 14B comprises a right side elevational, cross-sectional view of the system 2000 shown in FIG. 14A taken across the line 14B-14B in FIG. 14A. FIG. 15 is a right perspective view of the conduits 1022, 1024, 1030, 1131, 1132, 1133, 1134, 1141, 1142, 1143, 1144, 1151, 1152, 1153, 1154 (shown in these figures, but labeled with reference numerals(s) in prior figures), manifolds 1050, 1060, 1070 (shown in these figures, but labeled with reference numerals(s) in prior figures), air input system 2800, water input system 2700, baffled collection launders 1361, 1362, 1363, 1364 (shown in these figures, but labeled with reference numerals(s) in prior figures), cell walls 2370, air wash grid assembly 2090, filter water collection system 2077, and concrete base 1102 (shown in these figures, but labeled with reference numerals(s) in prior figures) of the system 2000 of FIG. 14A. FIG. 16 is a right perspective view of the conduits 1022, 1024, 1030, 1131, 1132, 1133, 1134, 1141, 1142, 1143, 1144, 1151, 1152, 1153, 1154 (shown in these figures, but labeled with reference numerals in prior figures), manifolds 1050, 1060, 1070 (shown in these figures, but labeled with reference numerals(s) in prior figures), air input system 2800, water input system 2700, baffled collection launders 1361, 1362, 1363, 1364 (shown in these figures, but labeled with reference numerals(s) in prior figures), air wash grid assembly 2090, filter water collection system 2077, and concrete base 1102 (shown in these figures, but labeled with reference numerals(s) in prior figures) of the system 2000 of FIG. 14A.

In the system 2000, a biological contactor 2012 is disposed within the upper chamber 2006 of the treatment vessel 2002. The biological contactor 2012 may be an upflow or a downflow biological contactor 2012. A downflow granular media filter 2014 may be disposed within the lower chamber 2008. The controller 2094 may control the system 2000, for example, in the operating mode 1400, filter cleaning mode 1500, and contactor cleaning mode 1600 (which are discussed in connection with FIGS. 11-13).

The system 2000 includes an air input system 2800 and a water input system 2700, each of which are in fluid communication with the contactor media chamber 2200. The air input system 2800 and the water input system 2700 may be at least partially disposed within the contactor media chamber 2200. The air input system 2800 may comprise a plurality of interconnected conduits 2801 having air outlet apertures 2803 disposed therein, a contactor air inlet connector 2034, and a contactor air inlet valve 2032. The air input system 2800 may be in fluid communication with a pressurized air source 1401.

The water input system 2700 may comprise a plurality of interconnected conduits 2701 having water outlet apertures 2703 disposed therein, a contactor water inlet connector 2038, and a contactor water inlet valve 2036. The water input system 2700 may be in fluid communication with a pressurized water source 1402.

Within the contactor media chamber 2200, the interconnected conduits 2701 of the water input system 2700 may be positioned within a layer 2083 of gravel 1084, while the interconnected conduits 2801 of the air input system 2800 may be disposed between the layer 2083 of gravel 1084 and the contactor media 1204. As with the first embodiment of the system 1000, air 1080 and water 1082 will be input into the contactor media chamber 2200 in the operating mode 1400. Also, air 1080 and/or water 1082 will be more vigorously input into the contactor media chamber 2200 during a contactor cleaning mode 1600.

In the system 2000, the filter cells 2351, 2352, 2353, 2354 are separated by cell walls 2370. Each of the filter cells 2351, 2352, 2353, 2354 comprises a deep layer 2087 of gravel 1084 (which might comprise gravel 1084 that increases in size along the vertical dimension 1090 toward the concrete base 1102) and a layer of filter media 1304 within the filter region 2300.

The system 2000 includes a filter air manifold 2070 with a plurality of filter air manifold branches 2071 and a filter air manifold inlet 2074, which are in controllable fluid communication with one of the filter cells 2351, 2352, 2353, 2354 employing filter air manifold valves 1072. Each of the filter air manifold valves 2072 is coupled to an air wash grid assembly 2090. An air wash grid assembly 2090 is disposed within each of the filter cells 2351, 2352, 2353, 2354 between the filter media 1304 and the deep layer 2087 of gravel 1084. Air 1080 will be provided via the air wash grid assemblies 2090 during the filter cleaning mode 1500. In addition, as some skilled in the art in this area believe that biology 1086 may be beneficial within the filter region 1300, for example, to continue ammonia removal.

A filter water collection system 2077 may be disposed within the deep layer 2087 of gravel 1084. The filter water collection system 2077 may comprise a plurality of interconnected conduits 2079 having water inlet apertures 2081 disposed therein and, as illustrated in the figures, may comprise one or more discrete sets of interconnected conduits 2079. The filter water collection system 2077 is used for transferring water 1082 from the system 2000 and may comprise one or more filter water outlet valves 2076 to control the flow of processed water 1082 from the system 2000.

FIG. 17A-17B

FIG. 17A-17D comprise various perspective and side views of one embodiment of an air wash grid assembly 2090 for the system 2000 of FIG. 14A. The air wash grid assembly 2090 may comprise interconnected conduits 2092 comprising air outlet apertures 2095. The inlet coupling 2091 on the air wash grid assembly 2090 may be located at different positions on the air wash grid assembly 2090 to receive and connect to one of the filter air manifold branches 2071.

Variations of the First and Second Embodiments

The first and second embodiments of the systems 1000, 2000 disclosed herein may be varied within the scope of the disclosed subject matter. It should be noted that only a few examples of this variation will be specifically identified, although many types of variation would be understood to one of skill in the art based on the disclosure made herein. For example, the upflow biological contactor 1012 may be replaced by a downflow biological contactor. As noted above, the controller 1094, 2094 may, through a series of signals (e.g., electrical or pneumatic signals), control the operation of the system 1000, 2000 through automation and/or remotely. In alternative embodiments, manual controls may be utilized, such as manually operated valves, in lieu of a controller 1094, 2094. Also, the valves 1051, 1052, 1053, 1054, 1032, 1036, 1076, 1061, 1062, 1063, 1064, 1072, 1076 disclosed herein may be wirelessly controlled, controlled through physical wires or controlled through pneumatic conduits.

In various embodiments, a transverse dimension 1092 of the biological contactor 1012, 2012 may be different than the transverse dimension 1092 of the granular media filter 1014, 2014. As illustrated in the figures, the upper chamber 1006, 2006 and the lower chamber 1008, 2008 may have the same width along the transverse dimension 1092. In alternative embodiments, the upper chamber 1006, 2006 may have a greater or smaller width along the transverse dimension 1092 relative to the lower chamber 1008, 2008. In addition, the upper chamber 1006, 2006 may be disposed immediately above the lower chamber 1008, 2008, as illustrated in the figures. In alternate embodiments, the upper chamber 1006, 2006 and the lower chamber 1008, 2008 may be in nonaligned positions along the transverse dimension 1092 (e.g., center point nonalignment or outer boundary nonalignment, as explained above).

Also, the treatment vessel wall 1004, 2004 may be of different shapes, such as in the shape of a cube or a three-dimensional rectangle, rather than being cylindrical in shape.

As an additional example, a downflow granular media filter 1014 of the second embodiment of the system 2000 could be implemented, for example, with the upflow biological contactor 1012 of the first embodiment of the system 1000. Conversely, a downflow granular media filter 1014 of the first embodiment of the system 1000 could be implemented together with the biological contactor 2012 of the second embodiment of the system 2000.

The number of filter cells 1351, 1352, 1353, 1354, inlet manifold valves 1051, 1052, 1053, 1054, inlet manifold branches 1131, 1132, 1133, 1134, outlet manifold branches 1151, 1152, 1153, 1154, and outlet manifold valves 1061, 1062, 1063, 1064 may be varied within the scope of the disclosed subject matter. In various embodiments, the number of filter cells 1351, 1352, 1353, 1354 may be at least three.

Also, rather than having contactor strainers 1206 or filter strainers 1306, the distribution plate 1208 and/or filter underdrain plate 1308 may be of a porous material. Thus, orifices 1209, 1309, which may be of uniform size or vary in size, may be used in lieu of the strainers 1206, 1306.

In addition, the shape and representation of many features and components in the description and figures are merely illustrative. For example, the downward incline 1039 may be directly vertical or oriented at another downward inclined angle to achieve the desired head pressure. The air wash grid assembly 2090 may comprise interconnected conduits 2092 arranged in various configurations along with the air outlet apertures 2095. The same can be said of the air input system 2800, water input system 2700, and filter water collection system 2077. Also, the strainers 1206, 1306 may vary in size and shape to achieve the objectives of preventing the passage of filter media 1304 or contactor media 1204 and metering the passage of air 1080 and water 1082 therethrough.

It should also be noted that the term "water input system" encompasses not only the water input system 2700 of the second embodiment of the system 2000, but may also encompass the contactor plenum 1202, distribution plate 1208, contactor strainers 1206, contactor plenum 1202, contactor water inlet connector 1038, and contactor water inlet valve 1036 of the system 1000. The term "air input system" encompasses not only the air input system 2800 of the system 2000, but may also encompass the contactor plenum 1202, distribution plate 1208, contactor strainers 1206, contactor plenum 1202, contactor air inlet connector 1034, and contactor air inlet connector 1034 of the system 1000.

As used herein (and as noted above), the term "air" 1080 should be broadly construed to encompass, for example, atmospheric air, liquid oxygen, or purified oxygen. The air 1080 supplied to the biological contactor 1012, 2012 comprises oxygen for the growth and sustenance of the biology 1086. The air 1080, however, supplied to the downflow granular media filter 1014, 2014 does not necessarily comprise oxygen. The air 1080 supplied to the downflow granular media filter 1014, 2014 is, in various embodiments, used merely during the cleaning mode 1500 to aid in dislodging particulate matter captured by the filter media 1304.

As used herein, the term "processed water" 1082 refers to water 1082 processed and output by the system 1000, 2000, i.e., water 1082 processed by the biological contactor 1012, 2012 and the filter 1014, 2014.

In various embodiments, the system 1000, 2000 may comprise at least three filter cells 1351, 1352, 1353, 1354. In various alternative embodiments, the system 1000, 2000 may comprise at least two filter cells 1351, 1352, 1353, 1354.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The previous description of the disclosed aspects is provided to enable any person skilled in the art to make or use the present disclosure. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope consistent with the principles and novel features disclosed.

What is claimed is:

1. A combination biological contactor and self-backwashing filter system for water treatment, the system having a vertical dimension when the system is in an installed orientation, comprising:
    a treatment vessel defining an upper chamber and a lower chamber, wherein the upper chamber is disposed above the lower chamber along the vertical dimension when the system is in the installed orientation;
    an upflow biological contactor disposed within the upper chamber, the upflow biological contactor comprising a contactor plenum separated from a contactor media chamber by a distribution plate, the contactor media chamber comprising biological contactor media, the contactor plenum being in fluid communication with the contactor media chamber via one or more contactor strainers disposed within the distribution plate;
    a downflow granular media filter disposed within the lower chamber, the downflow granular media filter comprising a filter region and a filter plenum separated by a filter underdrain plate, the filter region being disposed above the filter plenum along the vertical dimension when the system is in the installed orientation, the filter region comprising three or more filter cells separated by cell walls, wherein each of the filter cells comprises filter media, the filter plenum being in fluid communication with each of the filter cells via one or more filter strainers disposed within the filter underdrain plate;
    a contactor outlet conduit in fluid communication with the contactor media chamber and an inlet manifold, the inlet manifold comprising a plurality of inlet manifold branches, each of the inlet manifold branches in controllable fluid communication with one of a plurality of inlet-outlet conduits employing at least one of a plurality of inlet manifold valves, each of the inlet-outlet conduits in fluid communication with one of the filter cells; and
    an outlet manifold comprising a plurality of outlet manifold branches, each of the outlet manifold branches in controllable fluid communication with one of the plurality of inlet-outlet conduits and a waste-drain conduit employing at least one of a plurality of outlet manifold valves.

2. The system of claim 1, wherein the contactor outlet conduit includes a downward incline such that when the system is in the installed orientation and in an operating mode with water disposed in the contactor outlet conduit, the water in the contactor outlet conduit is directed by gravity generated head pressure toward the inlet manifold.

3. The system of claim 1, wherein an inlet-outlet opening of a first inlet-outlet conduit of the inlet-outlet conduits is disposed within a first filter cell of the filter cells, and wherein the contactor outlet conduit, the inlet manifold, and the first inlet-outlet conduit of the inlet-outlet conduits is shaped to define a first offset along the vertical dimension between an inlet of the contactor outlet conduit and the inlet-outlet opening of the first inlet-outlet conduit of the inlet-outlet conduits such that when the system is in the installed orientation and in an operating mode with water disposed in the contactor outlet conduit, gravity generated head pressure is sufficient to cause the water in the contactor outlet conduit to pass into the first filter cell of the filter cells when all intervening valves are open.

4. The system of claim 1, wherein a first inlet-outlet conduit of the inlet-outlet conduits comprises an inlet-outlet opening disposed within a first filter cell of the filter cells, and wherein the contactor outlet conduit, the inlet manifold, the first inlet-outlet conduit of the inlet-outlet conduits and the first filter cell of the filter cells are shaped to define a second offset along the vertical dimension between an inlet of the contactor outlet conduit and a remote end of the first filter cell of the filter cells such that when the system is in the installed orientation and in a filter cleaning mode with water disposed in the contactor outlet conduit, gravity generated head pressure is sufficient to cause the water in the contactor outlet conduit to pass down through a second filter cell of the filter cells and up through the first filter cell of the filter cells when all intervening valves are open.

5. The system of claim 1, further comprising:
a contactor air inlet connector disposed in a wall of the treatment vessel for placing the contactor plenum in controllable fluid communication with a pressurized air source employing a contactor air inlet valve;
a contactor water inlet connector disposed in the wall of the treatment vessel for placing a pressurized water source in controllable fluid communication with the contactor plenum employing a contactor water inlet valve; and
a filter water outlet connector disposed in the wall of the treatment vessel for conveyance of processed water out of the filter plenum in a controlled manner employing a filter water outlet valve.

6. The system of claim 5, wherein the cell walls separate the filter plenum into plenum cells, and further comprising a filter air manifold having a plurality of filter air manifold branches for controllably providing air to at least one plenum cell of the plenum cells employing a plurality of filter air manifold branch valves.

7. The system of claim 6, wherein the filter air manifold comprises one or more air wash grid assemblies, each of the one or more air wash grid assemblies comprising interconnected conduits with one or more air outlet apertures disposed within the interconnected conduits, wherein one of the one or more air wash grid assemblies is disposed within each of the filter cells.

8. The system of claim 6, further comprising a controller configured to open each of the inlet manifold valves, to open the contactor air inlet valve, to open the contactor water inlet valve, to open the filter water outlet valve, to close each of the outlet manifold valves and to close each of the filter air manifold branch valves during an operating mode.

9. The system of claim 6, further comprising a controller configured to close a first inlet manifold valve of the inlet manifold valves that controls a flow of water into a first filter cell of the filter cells and to open each remaining inlet manifold valve, to open the contactor air inlet valve, to open the contactor water inlet valve, to close the filter water outlet valve, to open a first outlet manifold valve of the outlet manifold valves that controls a flow of water from the first filter cell of the filter cells and to close each remaining outlet manifold valve during a filter cleaning mode.

10. The system of claim 6, further comprising a contactor outlet conduit valve disposed within the contactor outlet conduit to control passage of water into the inlet manifold, and a waste-drain conduit in controllable fluid communication with the contactor outlet conduit employing a waste-drain conduit valve.

11. The system of claim 10, further comprising a controller configured to open the contactor air inlet valve, to open the contactor water inlet valve, to close the contactor outlet conduit valve, to open the waste-drain conduit valve, to alter at least one of the pressurized air source to increase a flow of air through the contactor air inlet valve and the pressurized water source to increase a flow of water through the contactor water inlet valve, and to close each of the filter air manifold branch valves during a contactor cleaning mode for the upflow biological contactor.

12. The system of claim 1, further comprising biology disposed on the biological contactor media, wherein the biology reduces ammonia within water disposed in the contactor media chamber.

13. A combination biological contactor and self-backwashing filter system for water treatment, the system having a vertical dimension when the system is in an installed orientation, comprising:
a treatment vessel defining an upper chamber and a lower chamber, wherein the upper chamber is disposed above the lower chamber along the vertical dimension when the system is in the installed orientation;
a biological contactor disposed within the upper chamber, the biological contactor comprising a contactor plenum separated from a contactor media chamber by a distribution plate, the contactor media chamber comprising biological contactor media, the contactor plenum being in fluid communication with the contactor media chamber via one or more distribution plate orifices disposed within the distribution plate;
a downflow granular media filter disposed within the lower chamber, the downflow granular media filter comprising a filter region and a filter plenum separated by a filter underdrain plate, the filter region being disposed above the filter plenum along the vertical dimension when the system is in the installed orientation, the filter region comprising two or more filter cells separated by cell walls, wherein each of the filter cells comprises filter media, the filter plenum being in fluid communication with each of the filter cells via one or more filter underdrain plate orifices disposed within the filter underdrain plate; and
a contactor outlet conduit in fluid communication with the contactor media chamber and an inlet manifold, the inlet manifold comprising a plurality of inlet manifold branches, each of the inlet manifold branches in controllable fluid communication with one of the filter cells.

14. The system of claim 13, wherein the contactor outlet conduit includes a downward incline such that when the system is in the installed orientation and in an operating mode with water disposed in the contactor outlet conduit, the water in the contactor outlet conduit is directed by gravity generated head pressure toward the inlet manifold.

15. The system of claim 13, wherein the cell walls separate the filter plenum into plenum cells, and further comprising:
   a contactor air inlet connector disposed in a wall of the treatment vessel for placing the contactor plenum in controllable fluid communication with a pressurized air source employing a contactor air inlet valve;
   a contactor water inlet connector disposed in the wall of the treatment vessel for placing a pressurized water source in controllable fluid communication with the contactor plenum employing a contactor water inlet valve;
   a filter water outlet connector disposed in the wall of the treatment vessel for conveyance of processed water out of the filter plenum in a controlled manner employing a filter water outlet valve;
   a filter air manifold having a plurality of filter air manifold branches for controllably providing air to at least one plenum cell of the plenum cells employing a plurality of filter air manifold branch valves; and
   comprising a controller configured to close a first inlet manifold valve of the inlet manifold valves that controls a flow of water into a first filter cell of the filter cells and to open each remaining inlet manifold valve, to open the contactor air inlet valve, to open the contactor water inlet valve, to close the filter water outlet valve, to open a first outlet manifold valve of the outlet manifold valves that controls a flow of water from the first filter cell of the filter cells and to close each remaining outlet manifold valve during a filter cleaning mode.

16. A combination biological contactor and self-backwashing filter system for water treatment, the system having a vertical dimension when the system is in an installed orientation, comprising:
   a treatment vessel defining an upper chamber and a lower chamber, wherein the upper chamber is disposed above the lower chamber along the vertical dimension when the system is in the installed orientation;
   a biological contactor disposed within the upper chamber, the biological contactor comprising a contactor media chamber, the contactor media chamber comprising biological contactor media;
   a downflow granular media filter disposed within the lower chamber, the downflow granular media filter comprising a filter region, the filter region comprising two or more filter cells separated by cell walls, wherein each of the filter cells comprises filter media;
   a contactor outlet conduit in fluid communication with the contactor media chamber and an inlet manifold, the inlet manifold comprising a plurality of inlet manifold branches, each of the inlet manifold branches in controllable fluid communication with one of the filter cells employing at least one of a plurality of inlet manifold valves, wherein the contactor outlet conduit includes a downward incline such that when the system is in the installed orientation and in an operating mode with water disposed in the contactor outlet conduit, the water in the contactor outlet conduit is directed by gravity generated head pressure toward the inlet manifold;
   an air input system in fluid communication with the contactor media chamber; and
   a water input system in fluid communication with the contactor media chamber.

17. The system of claim 16, further comprising a filter underdrain plate disposed within the downflow granular media filter, and a filter strainer disposed within each of one or more filter underdrain plate orifices in the filter underdrain plate.

18. The system of claim 17, wherein the air input system comprises interconnected conduits positioned within the contactor media chamber.

19. The system of claim 16, further comprising a plurality of inlet-outlet conduits, wherein each inlet-outlet conduit places one of the plurality of inlet manifold branches in fluid communication with one of the filter cells, and an inlet-outlet opening of a first inlet-outlet conduit of the inlet-outlet conduits is disposed within a first filter cell of the filter cells, and wherein the contactor outlet conduit, the inlet manifold, and the first inlet-outlet conduit of the inlet-outlet conduits are shaped to define a first offset along the vertical dimension between an inlet of the contactor outlet conduit and the inlet-outlet opening of the first inlet-outlet conduit of the inlet-outlet conduits such that when the system is in the installed orientation and in the operating mode with water disposed in the contactor outlet conduit, gravity generated head pressure is sufficient to cause the water in the contactor outlet conduit to pass into the first filter cell of the filter cells when all intervening valves are open.

20. The system of claim 19, wherein the cell walls separate a filter plenum into plenum cells, and further comprising:
   an outlet manifold comprising a plurality of outlet manifold branches, each of the outlet manifold branches in controllable fluid communication with one of the plurality of the inlet-outlet conduits and a waste-drain conduit employing at least one of a plurality of outlet manifold valves;
   a contactor air inlet connector disposed in a wall of the treatment vessel for placing the contactor media chamber in controllable fluid communication with a pressurized air source employing a contactor air inlet valve, the contactor air inlet connector and the contactor air inlet valve comprising a portion of the air input system;
   a contactor water inlet connector disposed in the wall of the treatment vessel for placing a pressurized water source in controllable fluid communication with the contactor media chamber employing a contactor water inlet valve, the contactor water inlet connector and the contactor water inlet valve comprising a portion of the water input system;
   a filter water outlet valve positioned to control a flow of processed water out of the downflow granular media filter;
   a filter air manifold having a plurality of filter air manifold branches for controllably providing air to at least one plenum cell of the plenum cells employing a plurality of filter air manifold branch valves; and
   a controller configured to close a first inlet manifold valve of the inlet manifold valves that controls a flow of water into a first filter cell of the filter cells and to open each remaining inlet manifold valve, to open the contactor air inlet valve, to open the contactor water inlet valve, to close the filter water outlet valve, to open a first outlet manifold valve of the outlet manifold valves that controls a flow of water from the first filter cell of the filter cells and to close each remaining outlet manifold valve during a filter cleaning mode, wherein the contactor outlet conduit, the inlet manifold, the first inlet-outlet conduit of the inlet-outlet conduits and the first filter cell of the filter cells are shaped to define a second offset along the vertical dimension between the inlet of the contactor outlet conduit and a remote end of the first filter cell of the filter cells such that when the system is in the installed orientation and in the filter cleaning mode with water disposed in the contactor outlet conduit, gravity generated head pressure is sufficient to cause the water in the contactor outlet conduit to pass down through the first filter cell of the filter cells and up through a second one of the filter cells when all intervening valves are open.

* * * * *